United States Patent [19]

Kurkowski

[11] Patent Number: 5,005,151
[45] Date of Patent: Apr. 2, 1991

[54] INTERLEAVED ARBITRATION SCHEME FOR INTERFACING PARALLEL AND SERIAL PORTS TO A PARALLEL SYSTEM PORT

[75] Inventor: Hal Kurkowski, Dallas, Tex.

[73] Assignee: Dallas Semiconductor Corporation, Dallas, Tex.

[21] Appl. No.: 194,025

[22] Filed: May 13, 1988

[51] Int. Cl.⁵ ............................................. G06F 13/00
[52] U.S. Cl. ................................... 364/900; 341/100;
341/101; 364/939.5; 364/939; 364/927.92;
364/927.95
[58] Field of Search ... 364/200 MS File, 900 MS File;
341/78, 88, 100, 101; 371/78, 88, 100, 101

[56] References Cited

U.S. PATENT DOCUMENTS

| | | | |
|---|---|---|---|
| 3,914,553 | 10/1975 | Melindo et al. | 341/101 |
| 3,969,703 | 7/1976 | Kwiatkowski et al. | 364/900 |
| 4,052,702 | 10/1977 | Smith et al. | 364/200 |
| 4,177,511 | 12/1979 | Taddei | 364/200 |
| 4,410,962 | 10/1983 | Daniels et al. | 364/900 |
| 4,417,320 | 11/1983 | Ei | 364/900 |
| 4,728,930 | 3/1988 | Grote et al. | 341/101 |
| 4,789,960 | 12/1988 | Willis | 364/900 |
| 4,833,605 | 5/1989 | Terada et al. | 364/200 |

FOREIGN PATENT DOCUMENTS 0063912 11/1982 European Pat. Off. .
2168572 6/1986 United Kingdom ............. 341/101

*Primary Examiner*—Gareth D. Shaw
*Assistant Examiner*—Kevin A. Kriess
*Attorney, Agent, or Firm*—Worsham, Forsythe, Sampels & Wooldridge

[57] ABSTRACT

An arbitration circuit (10) is provided for selecting between a serial port (19) and a parallel port (21) for interface with a system port (17) having a system data bus (14) and a system address bus (16). A RAM (12) is supported by the buses (14) and (16). The arbiter (10) is operable to store a count value in an arbitration byte (38) which is addressable by the parallel port (21). The serial port (19) is operable to transfer data through a serial/parallel converter (30) to the system data bus (14) and system address bus (16) during a serial port access window. The parallel port (21) is allowed to access the system data bus and address bus at all other times. A count value indicating the duration of time before occurrence of the access window is stored in the arbitration byte (38) and is accessible by the parallel port and a parallel CPU (24) to determine when address and data information can be transmitted to the arbiter (10) for transfer to RAM (12). This provides an interleaved operation whereby the parallel port (21) can access the system during collection of data in the serial/parallel converter (30).

41 Claims, 12 Drawing Sheets

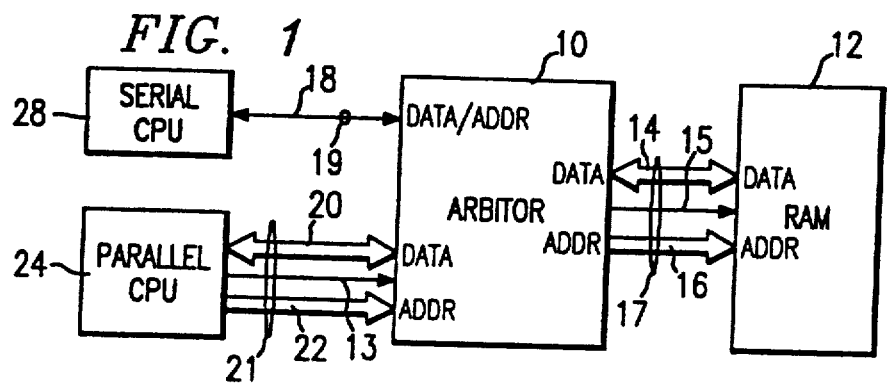
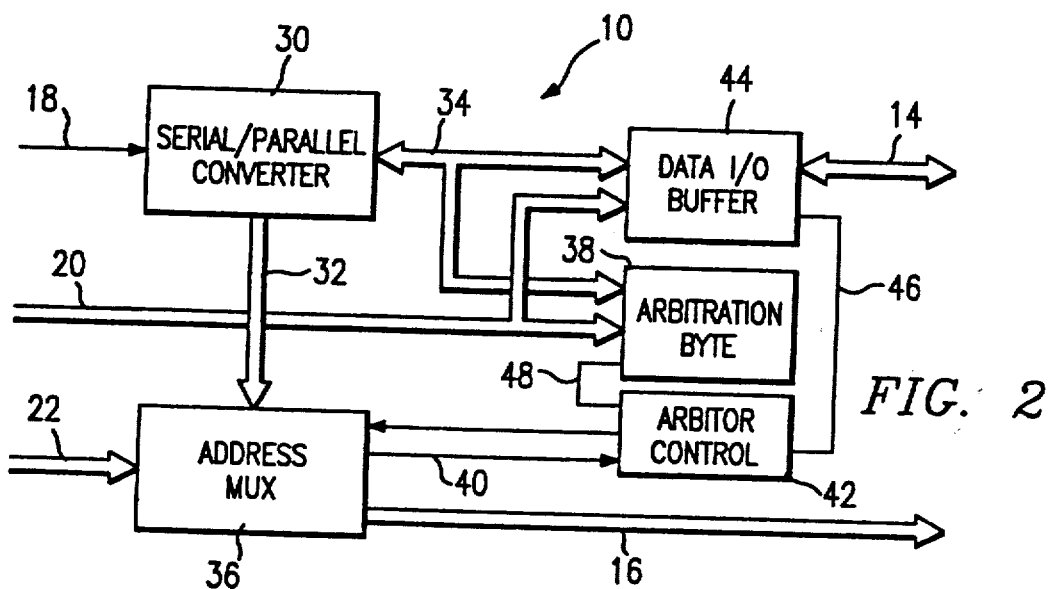
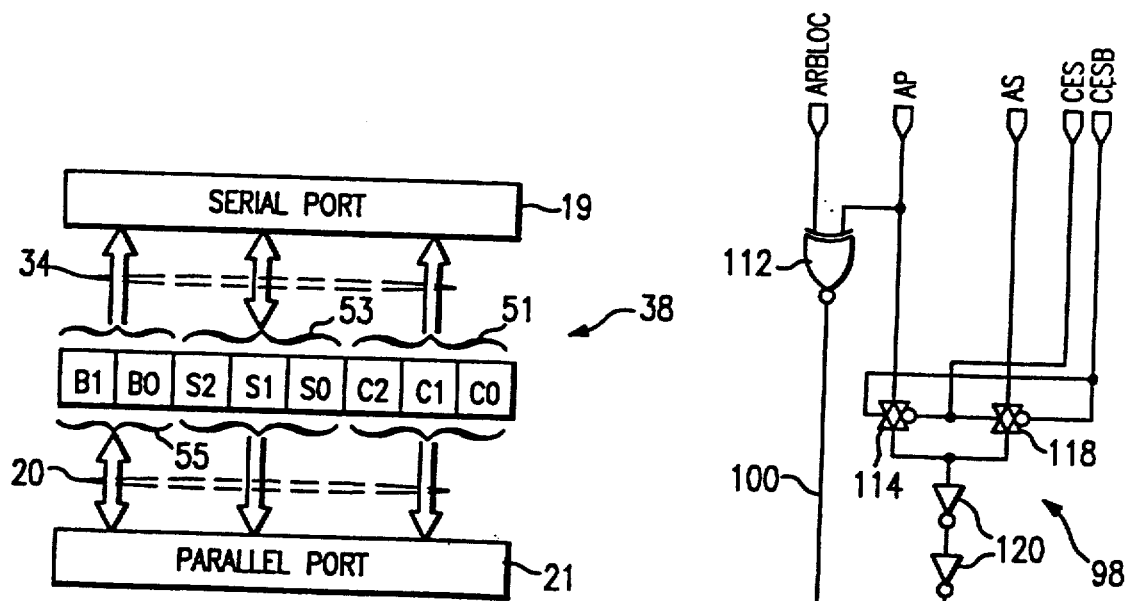

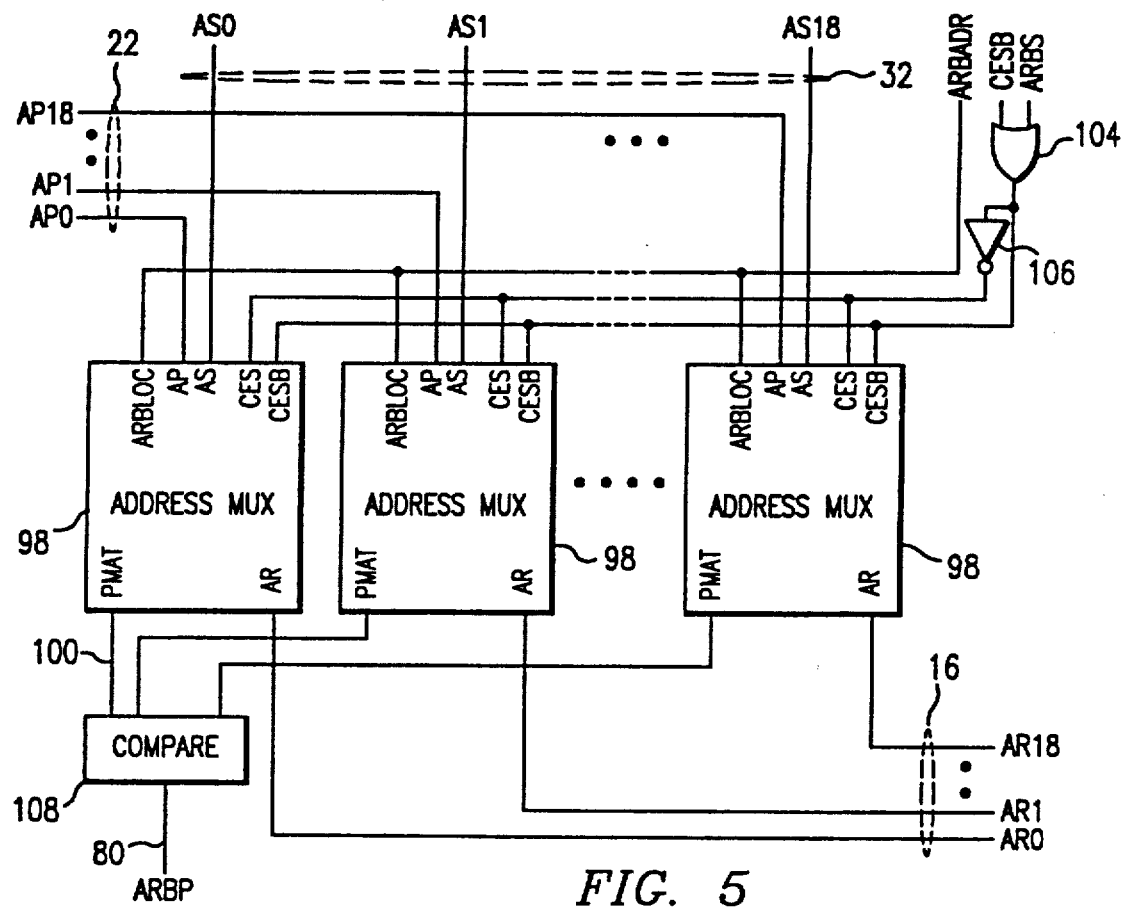
FIG. 5
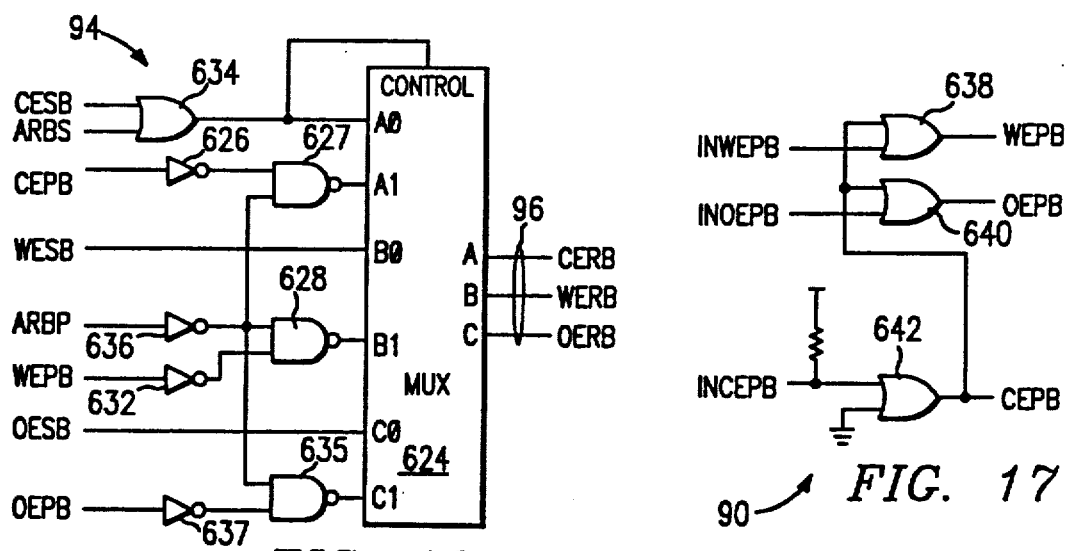
FIG. 16
FIG. 17

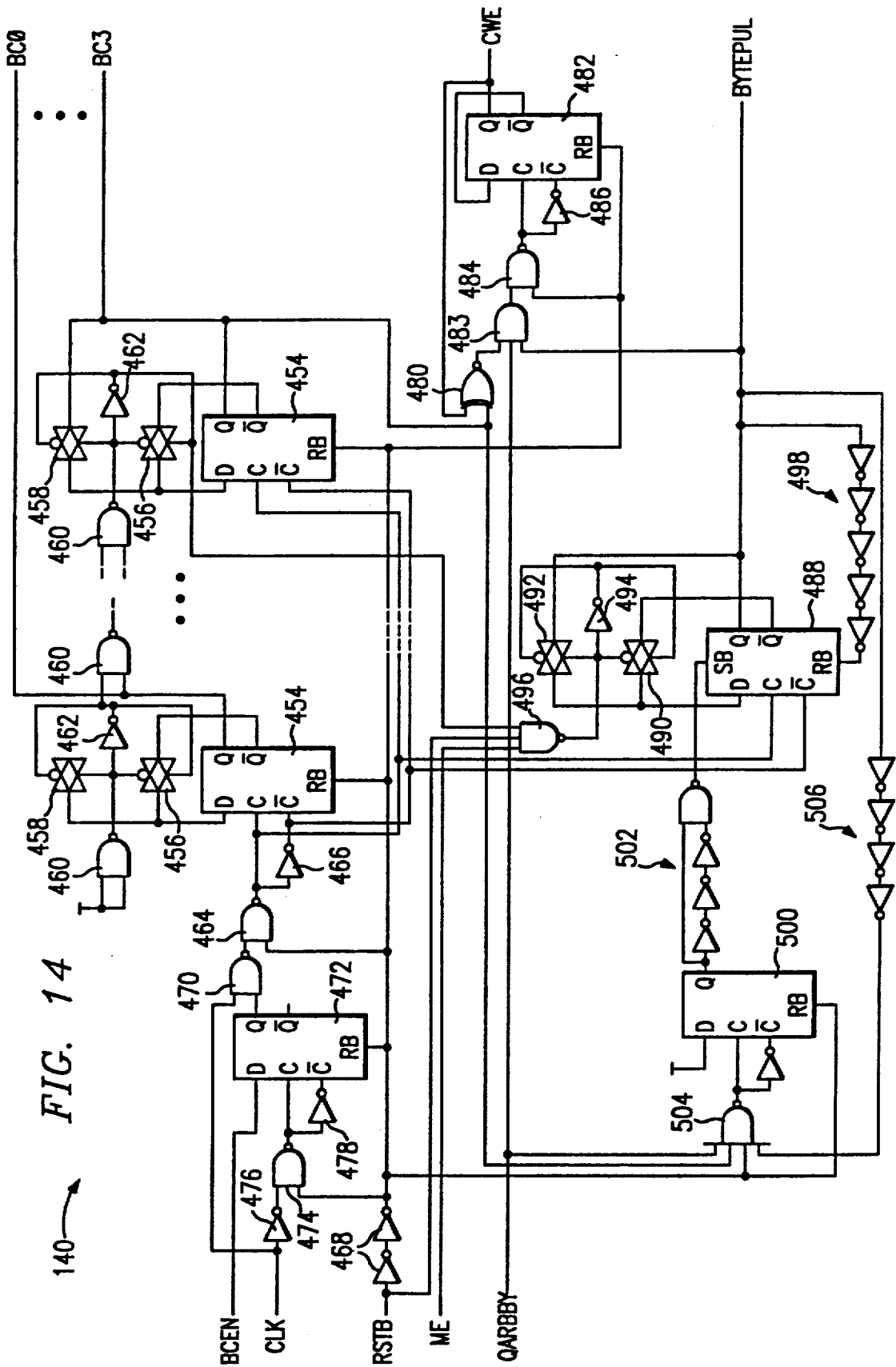

INTERLEAVED ARBITRATION SCHEME FOR INTERFACING PARALLEL AND SERIAL PORTS TO A PARALLEL SYSTEM PORT

TECHNICAL FIELD OF THE INVENTION

The present invention pertains in general to a bus arbitration scheme, and more particularly, to a bus arbitration scheme for selecting between a serial input bus and a parallel input bus for interface with a parallel system bus.

BACKGROUND OF THE INVENTION

The introduction of low-cost microprocessors has been one impetus in the push towards distributed processing. Almost all such microprocessors have the capability and the standard interfaces to be interconnected into distributed processing systems. In such systems, processors may be installed at remote sites near where processing is needed, and intercommunication among processors is usually done utilizing serial transmission techniques.

The 16- and 32-bit microprocessors, however, contain both hardware and software interlocks that provide a capability for multiprocessor system configurations. Such configurations can be done either by satellite processing (i.e. using special coprocessors), or by utilizing I/O processors that free the CPU from complex tasks that formerly required considerable CPU time.

These external intelligent requesters cooperate, and compete, for mastership not only of the common shared bus or system bus, but also of other shared resources of the system (e.g., memory, I/O space, peripherals, etc.). In such cases, a management protocol is required to make the relationship more equitable than a common master-slave relationship in which the resource-request line is dominated by a single system component. In the most general case, external intelligent requesters may all be CPUs and thus form a multiprocessor system in which each resource requester has equal importance and capability. In this way, functions may be distributed fully among those CPUs sharing common system resources. A system designer can thus partition the problem into separate tasks that each of several processors can handle individually and in parallel, increasing system performance and throughput. In such configurations, these complete and self-contained systems intercommunicate utilizing parallel transmission techniques, usually via the system bus. Appropriate connection links among processors are provided to free the system's designer from having to define which is the master and which is the slave. These are typically referred to as bus arbiters. Furthermore, the system bus allows each processor to work asynchronously and, therefore, both fast and slow microprocessors can be incorporated in the same system. Further, bus arbitration schemes can be provided that distinguish between a serial data link and a parallel data link, the serial data link typically being much slower than the parallel data link.

The most important considerations in multiprocessor systems utilizing an arbitration scheme are: (1) the processors should be able to interact properly with each other or with a peripheral unit without mangling the data; (2) they should be able to share system resources; and (3) synchronization among the processors should be ensured. Usually, a mechanism is formed to assure that these requisites are provided by software operating systems, but they do require proper hardware support. Most conventional microprocessors have appropriate control pins and special instructions for semaphore signaling, which temporarily renders one CPU the "system master" that controls a certain critical shared resource, such as a memory, and excludes all other processors from utilizing this resource. Such hardware support allows the development of operating systems that provide the mechanisms for multiprocessing implementation.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a top level block diagram of the arbitration scheme of the present invention;

FIG. 2 illustrates a detailed block diagram of the arbitration circuit;

FIG. 3 illustrates a block diagram of the arbitration byte;

FIG. 5 illustrates a block diagram of the address multiplexer;

FIG. 6 illustrates a block diagram of the address multiplexer for a single address line;

FIG. 14 illustrates a logic diagram of the fourbit byte counter;

FIG. 16 illustrates a logic diagram of the control mux; and

FIG. 17 illustrates a logic diagram of the parallel port buffers.

Figure 4:
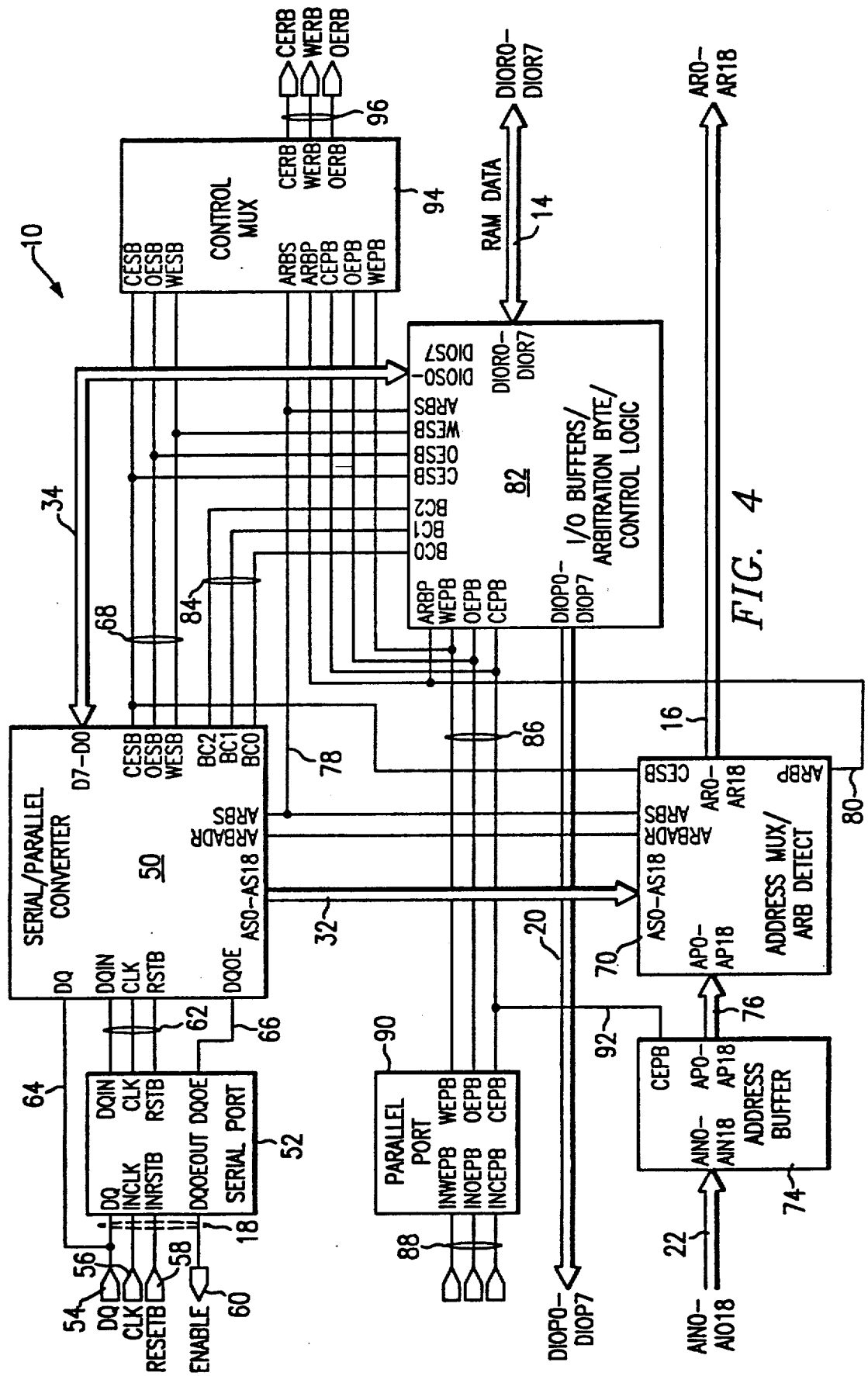
FIG. 4 illustrates a block diagram of the arbitration circuit.

It will be appreciated that for purposes of clarity and where deemed appropriate, reference numerals have been repeated in the figures to indicate corresponding features.

SUMMARY OF THE INVENTION

The present invention disclosed herein comprises a method and apparatus for selecting between a parallel port and a serial port and interfacing address and data information between the selected parallel or serial port and a parallel system port. The apparatus includes conversion circuitry for converting serial information to parallel information and parallel information to serial information at the serial port to interface with the parallel system port and providing access to the system port by the parallel port during a serial access window. The parallel port is allowed to access the system port when the serial access window is not present. The duration of time remaining before the occurrence of the serial access window is determined and this duration of time is constantly updated and stored in a storage register. The contents of the storage register are output to the parallel port in response to receiving access signals from the parallel port. A processing unit attached to the parallel port is operable to receive the contents of the storage register and to determine when the access window will occur.

In another embodiment of the present invention, the access window is synchronized to the data string on the serial port with the parallel port operating asynchronously. The access window is periodically generated with a counter provided that is initiated at the end of an access window with a maximum count value indicating the beginning of the next access window. The count value is stored in the storage register for output to the parallel port.

In yet another embodiment of the present invention, the serial port initiates access to the system by first sending a protocol word containing control information. The first access window is generated upon full receipt of the control word followed by a transfer of address and data information between the serial port and the system port. Prior to initiation of access, a predetermined value is stored in the storage register. After initiation of access and prior to full receipt of the control word, the duration of time before the occurrence of the first to occur of the access windows is determined and stored in the register.

DETAILED DESCRIPTION OF THE INVENTION

ARBITRATION SYSTEM

Referring now to FIG. 1, there is illustrated a block diagram of the arbitration scheme of the present invention utilized for communication with a peripheral memory unit. An arbiter 10 is provided for interfacing with a random access memory (RAM) 12 through a system port 17 having a bi-directional system data bus 14 and a system address bus 16 in addition to a control bus 15. The arbiter 10 is operable to select between a serial port 19, that is interfaced with a serial data link 18 containing both data and address information, and a parallel port 21, that is interfaced with a bi-directional data bus 20 and an address bus 22 in addition to a control bus 13. The parallel data and addresses associated with the data bus 20 and the address bus 22 and the control signals associated with control bus 13 are typically received from a CPU referred to hereinafter as a parallel CPU 24. The serial data link 18 is typically interfaced with a CPU referred to hereinafter as a serial CPU 28. As will be described in more detail hereinbelow, the serial CPU 28 and the parallel CPU 24 are operable to poll the arbiter 10 to determine the availability of the system data bus 14 and the system address bus 16 through transmission of an address thereto. Further, information can be stored in the arbiter 10 providing handshake information between the two CPUs 24 and 28.

Referring now to FIG. 2, there is illustrated a detailed diagram of the arbiter 10 of FIG. 1. The serial data link 18 on the serial port 19 is connected to a serial/parallel converter 30 which is operable to decode data and addresses from the serial data stream for output of the decoded address on a parallel address bus 32, and to interface the decoded data with a bi-directional data bus 34. Decoded data can be received from the serial data stream on the serial data link 18 and converted to parallel data or, conversely, data can be received from the data bus 34 and converted into a serial data stream for output on the serial data link 18.

The address bus 32 and the address bus 22 are input to an address multiplexer 36. The output of the address multiplexer 36 is connected to the system address bus 16 such that the RAM 12 can be addressed from either the serial data link 18 or the parallel address bus 22. As will be described hereinbelow, the handshake between the serial CPU 28 and the parallel CPU 24 is achieved through the use of a predetermined memory location which is contained within the arbiter 10 in the form of an arbitration byte 38. The address multiplexer 36 is operable to determine if the address on either the address bus 22 or the address bus 32 matches the address location for the arbitration byte 38. When a match exists for either the address on the parallel bus 22 or the address on the parallel bus 32, an arbitration match signal is sent out on a control line 40 to an arbiter control circuit 42. As will be described in more detail hereinbelow, a dual port function is provided that allows either the serial CPU 28 or the parallel CPU 24 to access the arbitration byte 38 regardless of which CPU 24 or 28 has access to the system data bus 14 and system address bus 16.

The data bus 34 and the data bus 20 are connected to a first input/output terminal of a data I/O buffer 44, a second input/output terminal of which is interfaced to the RAM 12 through the system data bus 14. The data I/O buffer 44 is interfaced with the arbiter control 42 through a control line 46 to determine which of the data buses 20 or 34 is to be connected to the system data bus 14 for transfer of data therebetween.

In addition to being interfaced with the I/O buffer 44, each of the data buses 34 and 20 is also interfaced with the arbitration byte 38 to input data thereto and to receive data therefrom, the arbitration byte 38 controlled by the arbiter control 42 through a control line 48. It should be noted that the arbitration byte 38 provides a dual port function. This dual port function allows both data buses 20 and 34 to input data to and receive data from the arbitration byte 38 simultaneously. Therefore, the address location of the arbitration byte 38 can be simultaneously input to the arbiter 10 by both the serial CPU 28 on the serial data link 18 and the parallel CPU 24 on the parallel address bus 22 to either read information from the arbitration byte 30 or input information thereto to provide information to the dual port function.

Since the arbitration byte 38 has a predetermined address associated therewith, this predetermined address is not available for addressing the RAM 12. In the preferred embodiment, the address is either all zeroes or all ones indicating the top address or the bottom address in the address sequence for the RAM. For example, if the address associated with the arbitration byte 38 were all zeroes, this would result in the one byte in the RAM 12 at address $\phi\phi\phi...\phi\phi\phi$ being unavailable for reading or writing.

Referring now to FIG. 3, there is illustrated a simplified block diagram of the arbitration byte 38 which is interfaced to the serial port 19, and the parallel port 21. The arbitration byte 38 is comprised of eight storage locations for storing an eight-bit word. The eight-bit arbitration byte is divided into three fields, a first three-bit field 51 with data bits $C\phi$, C1 and C2, a second three-bit field 53 with data bits $S\phi$, S1 and S2 and a third data field 55 with data bits $B\phi$ and B1.

The first field 51 is a read only field which can only be read by the serial port 19 and the parallel port 21. This information constitutes system information which can be used to transmit status information, control information, etc. from the arbiter 10 to the serial port 19 and the parallel port 21. The second field 53 comprises serial port information which is written to the arbitration byte 38 by the serial port 19. The information in the second field 53 can be read by either the serial port 19 or the parallel port 21. The second field 53 therefore provides a handshake path between the serial port 19 and the parallel port 21 to allow communication therebetween which sometimes is referred to as baton passing. In a similar manner, the third field 55 is operable to be written to by the parallel port 21 and to be read from by both the serial port 19 and the parallel port 21. This third field allows information to be passed from the parallel port 21 to the serial port 19.

Arbiter Operation

There are two modes of operation for the arbiter 10 of the present invention, a simplified mode and an interleaved mode. In the simplified mode, the parallel port 49 writes a "1" to the memory location B1 in the arbitration byte 38 after it has access to the system. The serial port 19 polls the arbitration byte 38 until bit B1 is equal to a "0". The serial port 19 then writes a "1" into the memory location S2 in the second field 53 and then reads the third field 55 to confirm that the bit B1 is still equal to zero. In the preferred embodiment, this operation will be executed with a special protocol such that a read status of B1/write status of S2/read status of B1 can occur with only one protocol issued, minimizing the protocol overhead required by the serial port 19 to gain access. When the serial port 19 releases the system port 17, a "0" is written to S2 and the serial port 47 goes back to a condition wherein it polls the status of B1 in the third field 55.

The parallel port 21 in the simplified mode is operable to poll the S2 bit in the second field 53 until the bit S2 is equal to "0". When the bit S2 is equal to "0", the parallel port 21 writes a "1" to the B1 bit and then reads the S2 and B1 bits to confirm that the S2 bit is equal to zero and the B1 bit is equal to "1". If during this confirmation, S2 is a "1", a collision could occur, and therefore, the parallel port 21 then writes a "0" to the B1 bit and returns to the polling mode. However, once the parallel port 21 has gained access, it is allowed to execute Reads and Writes to the RAM 12. When the transaction is completed, the parallel port 21 writes a "0" to the B1 bit. Although this is a simplified scheme, the additional bit B$\phi$ in the field 55 and the additional bits S$\phi$ and S1 in the field 53 allow for additional handshake bits to accommodate a more elaborate handshaking scheme.

In the second mode of operation, interleaving of access is allowed. In this interleaved operation, the parallel port 21 is allowed access to the RAM 12 during the time in which the serial port 19 is accumulating serial data for a Write operation or outputting serial data in a Read operation. During a Write operation, serial data is transmitted to serial port 19 and accumulated until a predetermined number of bits are received. This predetermined number of bits is then transferred in a parallel configuration to the RAM during a very short serial access window. The duration of time for the serial access window is typically much shorter than the time required to accumulate the serial data. In a similar manner, during a Read operation, the data is output from the RAM 12 in a parallel configuration during the serial access window and then serially shifted out of the serial port 19. The time for serially shifting in data or serially shifting out data is a function of a serial clock which typically requires one cycle of the clock for shifting each bit of data in or out of the serial port 19. Depending upon the system, the period of the serial clock is much longer than the access time for the RAM 12. As will be described hereinbelow, the serial port 19 is provided priority at all times, such that when the serial access window occurs, data is either transferred to the RAM or transferred from the RAM. The duration of time between the occurrence of adjacent serial access windows is utilized to serially shift in data or serially shift out data. During this period of time, the parallel port 21 is allowed to access the RAM for Reads and Writes, but is inhibited from accessing the RAM during the serial access window. This constitutes an interleaved operation, wherein data transfer between the RAM 12 and the parallel port 21 occurs outside the serial access window or actual transfer of data between serial port 19 and the RAM 12 occurs.

The interleaved operation allows the parallel port 21, which typically operates at a much higher rate, to access the RAM 12 outside the serial access window. The parallel CPU 24 utilizes the information stored in the first field 51 to determine the relative location in time of the serial access window. These bits C$\phi$–C2 indicate a count value representative of the approximate amount of time left before the next serial access window will occur. This provides information to the parallel CPU 24 as to when a Read or Write will occur between the serial/parallel converter 30 and the RAM 12.

In the interleaved mode, neither the status bits B$\phi$–B1 or the status bits S$\phi$–S2 are required to be written to. The information bits C$\phi$–C2 in the first field 51, in the preferred embodiment, are the only information utilized by the parallel CPU 24 to determine when a Read or Write by the parallel port 21 can occur. A full count is indicated when all of the bits C$\phi$–C2 are equal to a logic "1" and this corresponds to the time the serial access window is generated. The time required to count from all zeroes to all ones is the amount of time required to load an entire byte of serial data into the serial/parallel converter 30 for transfer to the bus 34 or, conversely, output serial data from the serial port 19 during a Read operation. Therefore, the parallel CPU 24 can determine when the serial access window will occur, thus enabling the parallel CPU 24 to avoid a collision. By having knowledge of when serial access window will occur, the parallel CPU 24 is provided with knowledge of the available access time. It should be noted that this occurs asynchronously with respect to the serial clock.

The parallel CPU 24 determines the available access time by polling the status of the C$\phi$–C2 bits. By knowing the frequency of the serial clock associated with the serial CPU 28, the parallel CPU 24 can determine the amount of time left before the serial port accesses the RAM 12. Thus, in the preferred embodiment, the serial CPU 28 is given priority of access to the RAM 12 during the serial access window, and the parallel CPU 24 determines when it can access the RAM 12 to avoid collision with the transfer of data and addresses from the serial CPU 28.

The additional bits B$\phi$–B1 and S$\phi$–S2 in the third field 55 and the second field 53, respectively, can be used or defined to transfer other information between the two ports. For example, the serial port 19 could transfer information regarding the serial clock frequency to the second field 53 for access by the parallel CPU 24. These additional bits could also indicate the amount of RAM written to, the section into which it was written, etc.

In operation, the interleaved arbitration scheme places bus priority with the serial CPU 28. Initially, a fifty-six bit protocol word is input to the serial port preceded by a reset signal. This protocol word provides information such as whether a Read/Write operation is to be performed, what the starting address is and various other control functions. The clock for loading the protocol word into the serial/parallel converter 30 is provided on the serial data link 18 such that this operation is synchronized with the data rate of the serial data string.

Once the protocol word with the control information is loaded into the arbiter 10, the arbiter 10 then receives serial data from the serial data link 18 during a Write operation, accumulates this data and then outputs it to a parallel bus 34 during the serial access window. The serial access window occurs at the end of each byte of data that is accumulated by the serial/parallel converter 30 during the Write operation. During the Read operation, data is transferred from the parallel bus 34 during the serial access window and then serially transmitted out to the serial data link 18.

The parallel CPU 24 is operable to periodically send out the address for the arbitration byte 38. The presence of this address is detected by the address multiplexer 36 which outputs an arbitration match signal on line 40 to the arbiter control 42 when a match exists. The contents of the first field 51 in the arbitration byte 38 is then output on the bus 20. It should be noted that the arbitration byte 38 is a dual port memory location, and as such, the parallel CPU 24 can access the contents thereof independent of whether the serial CPU 28 or the parallel CPU 24 has access to the RAM 12 through the system port 17.

The parallel CPU 24 evaluates the count value bits $C\phi$–C2 to determine when the serial access window will occur, this indicating the end of a byte in the serial data string during a Write or the beginning of a byte during a Read. The count value therefore provides a reference for the parallel CPU 24. The parallel CPU 24 is not synchronized with the clock of the serial CPU 28, and as such, some error is present in determining when the end serial access window occurs. Therefore, the parallel CPU 24 calculates a maximum count value beyond which it will not attempt access to the RAM 12. For example, the maximum count value for the bit $C\phi$–C2 is eight. To insure that the parallel CPU 24 does not access the RAM 12 during the access window, the parallel CPU 24 does not attempt access after a count value of six. By providing this time buffer, inhibiting of access by the parallel CPU 24 during the serial access window will be assured. For example, if the parallel CPU 24 determines that the count value is zero, there is no way of knowing whether the count value has been sampled at the beginning of the serial clock cycle or at the end of the clock cycle. This results in an error of one full period of the serial clock. In a similar manner, sampling of the count value at a count value of seven does not provide information as to whether the arbitration byte 30 was sampled at the beginning of the serial clock cycle or at the end. Therefore, by terminating parallel access from the parallel port 21 when the count value is equal to six, this can insure the condition where the count value was sampled at the end of the clock cycle during the generation of the count value of six.

The parallel CPU need only sample the arbitration byte 38 once every eight clock cycles of the serial clock. If the serial CPU 28 ceases to transmit information, the count value is set to all zeroes such that the parallel CPU 24 then knows that it has at least six full clock cycles at the serial clock frequency to access the RAM 12. It is not necessary for the parallel CPU 24 to know whether the serial CPU 28 is communicating with the RAM 12 but, rather, the parallel CPU 24 need only know the approximate location in time of the serial access window.

When the serial CPU 28 initially accesses the arbiter 10, it is important that the operation of incrementing the count value be initiated before the protocol word is completely loaded into the arbiter 10. This is important from the standpoint of a serial Read operation where data is transferred from the RAM 12 immediately upon loading of the protocol word, wherein an address can be output to the RAM 12 and data transferred therefrom for conversion to serial data. Therefore, incrementing of the count value is initiated eight clock cycles prior to completion of loading of the protocol word. This will insure that the parallel CPU 24 can determine when the first access window will occur.

Arbiter

Referring now to FIG. 4, there is illustrated a block diagram of the arbiter 10 of FIG. 2 wherein like numerals refer to like parts in the various figures. The serial/parallel converter 30 of FIG. 2 incorporates a serial/parallel converter 50 and a serial port buffer 52. The serial port buffer 52 is operable to interface with a serial data line 54 for receiving and transmitting data on an input/output DQ, a clock line 56 for receiving a clock signal CLK, a reset pin 58 for receiving a RESET signal and an enable pin 60 for outputting a data Output Enable signal. The serial port buffer 52 is operable to interface with the serial/parallel converter 50 on three lines 62 to input received input data DQIN, the clock signal CLK and a reset signal RSTB to the serial/parallel converter 50. The serial/parallel converter 50 outputs serial data to the data pin 54 on a serial data line 64. A separate Output Enable signal DQOE is transferred from the serial/parallel converter 50 to the buffer 52 on a line 66.

The serial/parallel converter 50 is operable to receive serial data and convert it to parallel data for output on the parallel data bus 34 and receive parallel data therefrom on input data lines $D\phi$–D7. In a similar manner, a 19-bit address on address outputs $AS\phi$–AS18 is interfaced with the address bus 32. The serial/parallel converter 50 is operable to generate the byte wide count value $C\phi$–C2 on the three lines 68 labelled $BC\phi$–BC2 and the three control signals representing the serial Chip Enable signal CESB, serial Output Enable signal OESB and serial Write Enable signal WESB. In addition, an output ARBADR is provided representing an arbitration address signal, which signal indicates whether the address of the arbitration byte 38 is all zero's or all one's.

The address multiplexer 36 is represented by an address multiplexer/arbitration detect circuit multiplexer/detect circuit 70 and an address buffer 74. The address buffer 74 interfaces on the input thereof with the parallel address bus 22 to receive the 19-bit address AIN∅–AIN18 for input to the multiplexer/detect circuit 70 on a bus 76. The other parallel input of the multiplexer/detect circuit 70 is connected to the parallel address bus 32 from the serial/parallel converter 50 and the output thereof is interfaced with the system address bus 16. The multiplex/detect circuit 70 receives the signals ARBADR, CESB and ARBS from the serial/parallel converter 50 for input thereto.

The multiplexer/detect circuit 70 is operable to provide a multiplexing operation for routing either the address on bus 32 or the address on bus 22 to the system address bus 16. Additionally, the multiplex/detect circuit 70 is operable to determine whether either of the address buses 22 or 32 have present thereon the address of the arbitration byte 38. If the address of the arbitration byte 38 is on bus 32, representing an address from the serial data link 18, a match is determined and a signal ARBS output on a line 78 and, if the address of the arbitration byte 38 is present on the bus 22, a signal ARBP is output on a control line 80. It should be noted that the detection of the arbitration address is independent of the multiplexing operation such that this detection takes place before the multiplexing operation. The output CESB is provided to allow the serial port to have priority over the parallel port, as will be described in more detail hereinbelow.

The arbitration byte 38 and the arbiter control 42 are contained in an I/0 buffer/arbitration byte control circuit 82 which has three parallel data ports connected to the bus 20, the bus 34 and the system data bus 14, respectively. The control circuit 82 provides direction control logic and a storage location for the arbitration byte 38. The control circuit 82 receives the count value of C∅–C2 from the serial/parallel converter 50 on lines 84 and the serial port control signals CESB, OESB and WESB on lines 68. The arbitration match signals ARBP and ARBS on lines 78 and 80 are also input thereto in addition to parallel port control signals WEPB, OEPB and CEPB, representing the Write Enable, Output Enable and Chip Enable signal, respectively, on lines 86. The lines 86 are interfaced with input control lines 88 from the parallel port through parallel port control buffers 90. The Chip Enable signal is output from the parallel port control buffers 90 and is also input to the address buffers 74 through a line 92.

The Chip Enable, Output Enable, and Write Enable signals for both the parallel and the serial ports on the lines 68 and 86, respectively, are input to a control multiplexer 94 in addition to the parallel and serial arbitration match signals ARBP and ARBS on lines 78 and 80. The control multiplexer 94 outputs the control signals CERB, WERB, OERB, representing the system Chip Enable, Write Enable, and Output Enable signals respectively, for input to the RAM 12 on lines 96.

Address Mux/Detect Circuit

Referring now to FIG. 5, there is illustrated a block diagram of the multiplexer/detect circuit 70 of FIG. 4, wherein like numerals refer to like parts in the various figures. The address buses 22, 32 and 16 are each nineteen bits wide with each of the address lines therein associated with a separate address multiplexer/detect circuit 98. Each of the address multiplexer/detect circuits 98 has a parallel address input AP for being associated with the respective address line in the bus 22, and a serial input address AS for being connected to the associated address line in the bus 32. The address line of the bus 16 associated therewith is connected to an output label AR. Each of the address multiplexer/detect circuits 98 also provides a match detect function for the parallel port by comparing the received bit on the input AP and outputting the match signal on the output line 100 representing a parallel match output PMAT. The arbitration address signal ARBADR is input directly to an input labelled ARBLOC. In a similar manner, the signal CESB is input to one input of an OR gate, the other input connected to the ARBS signal, which signal indicates access to the arbitration byte 38 from the serial port 19. The output of OR gate 104 is input to each of the address multiplexer/detect circuits 98 in addition to the non-inverted form thereof through an invertor 106. If either CESB or ARBS is a "1", then the parallel port addresses are selected, otherwise serial port addresses are selected.

Each of the parallel match output signals PMAT on line 100 are input to a compare circuit 108, the output of which represents the ARBP match signal on line 80. The compare circuit 108 is comprised of an AND function that requires the presence of a predetermined logic state on all of the lines 100 in order to provide a true compare signal on the output line 80. Although not shown, the compare circuit 108 is comprised of a plurality of multiple input NAND gates and NOR gates. However, it should be understood that any logic function which provides a compare function that requires the presence of a predetermined logic state on all nineteen of the output lines 100 will provide the appropriate function.

Referring now to FIG. 6, there is illustrated a detailed logic diagram of one of the address multiplexer/detect circuits 98. The parallel address line on the AP input is input to one input of an Exclusive NOR gate 112 and also to the input of a transfer gate 114. In a similar manner, the serial address line on the input AS is input to one input of an Exclusive NOR gate 116 and also to the input of a transfer gate 118. The other input of both of the Exclusive NOR gates 112 and 116 are connected to the arbitration address input ARBLOC. The outputs of transfer gates 114 and 118 are connected to the AR Output through two series connected invertors 120. The Exclusive NOR gates 112 and 116 provide a matching function to output a logic "1" when both inputs are either a logic "0" or a logic "1".

The transfer gates 114 and 118 are controlled by the signal CESB which represents the inverse of the signal CES. When CES is high, the transfer gate 118 connects the AS input to the AR output and the transfer gate 114 inhibits transfer of the input AP to the output AR. Conversely, when CES is low, the AP input is connected to the AR output and the AS input is disconnected from the AR output. Therefore, the presence of the CES signal controls the multiplexing function such that the serial port has priority. As will be described hereinbelow, this occurs only after loading of internal shift registers with the serial data to convert it to parallel data and address information for output on the address bus 32 and the data bus 34, respectively. This occurs during a very short duration access window.

Serial/Parallel Convertor

Figure 7:
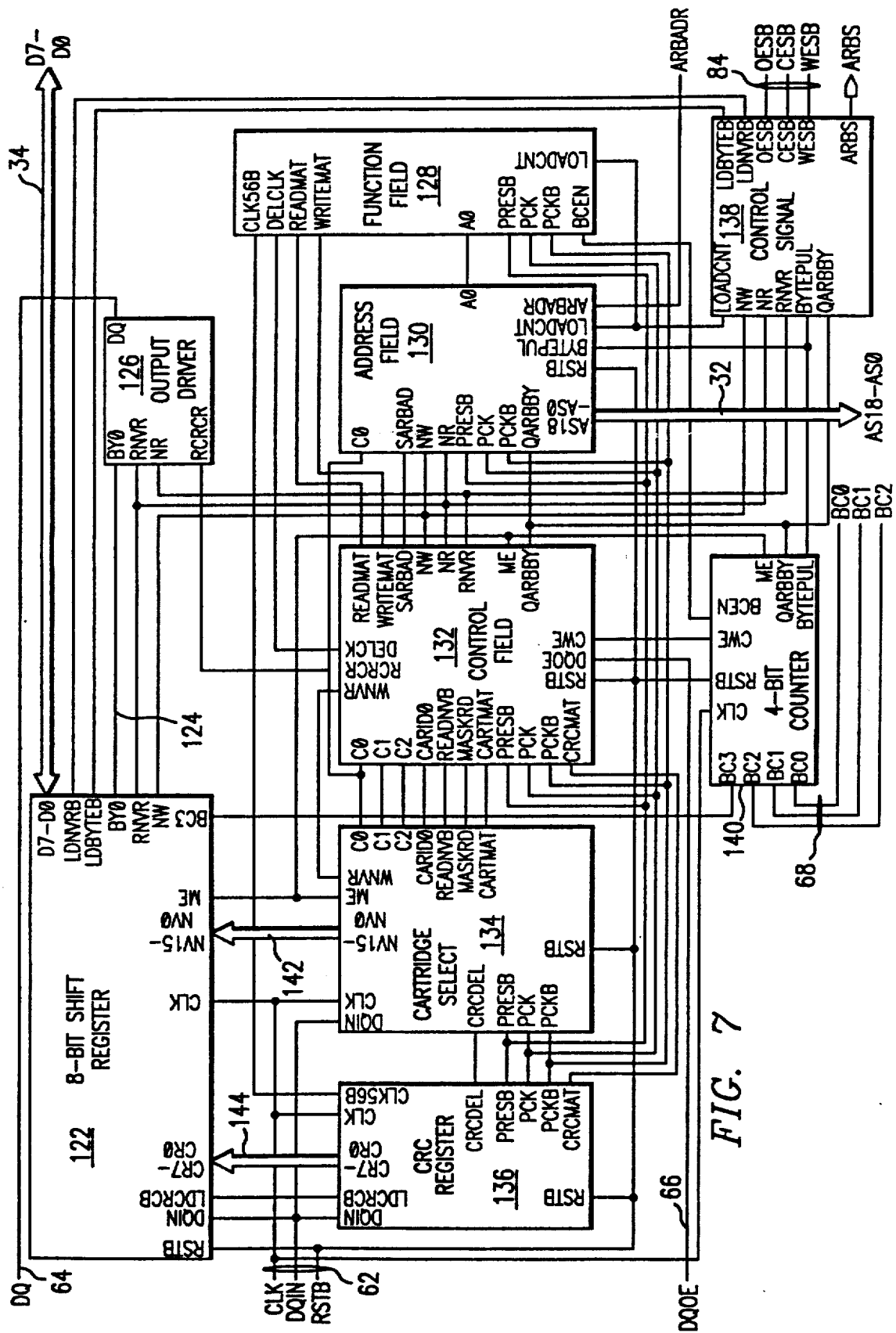
FIG. 7 illustrates a block diagram of the serial to parallel converter.

Referring now to FIG. 7, there is illustrated a block diagram of the serial/parallel converter 50 of FIG. 4, wherein like numerals refer to like parts in the various figures. The DQIN input from lines 62 is input to an eight-bit shift register 122 which is operable to receive on the input thereof serial data and convert it to parallel data for output on bus 34 through outputs D$\phi$-D7. Conversely, on a Read operation, data is received on the parallel data inputs D$\phi$-D7 and collected in the shift register for shifting out on an output BY$\phi$ to an output line 124. The output line 124 is connected to the input of an output driver 126 which is connected to the DQ output line 64. The eight-bit shift register is clocked by the CLK signal and reset by the RSTB signal from the lines 62. Therefore, after a Read or Write function is determined, data can be sequentially input to the eight-bit shift register 122 during the Write operation and then output on the data bus 34. As will be described hereinbelow, an initial address is input to the serial/parallel converter and then this address internally incremented such that only a continuous stream of data is transferred thereafter.

Protocol Shift Register

Initially, after a reset signal is received, a protocol word comprising a fifty-six bit string of data is input to the serial/parallel converter 50 to provide a function field, address field, a control field, an identification (ID) field and an error check field. The function field is collected in a function field block 128 which is operable to determine whether a Read or Write operation will occur, and is comprised of the first eight bits of the protocol word. The address information is stored in an address field block 130 which stores the next nineteen bits of the protocol word to determine the initial address. The control field is comprised of the next five bits of the protocol word which are stored in a control field block 132. The control field determines the specific type of Read or Write Operation that will occur. The ID field is comprised of the next sixteen bits of the protocol word and is stored in a cartridge select block 134, and provides the function of comparing the sixteen bit ID with an internally stored reference and then outputting a match signal if the ID is correct. Error checking is provided through a cyclical redundancy check scheme and is provided by the next eight bits of the protocol word in a CRC register circuit 136. The function block 128, address field block 130, control field block 132, cartridge select block 134, and CRC register 136 are arranged in a serial fashion such that the protocol word is input to the CRC register 136 until all fifty-six bits are serially loaded through the CRC registers and the remaining circuitry until the first eight bits input thereto reside in the function field block 128. This circuitry comprises a protocol shift register. After completion of loading into the protocol shift register, the appropriate operation is selected and data either read from the RAM 12 or written thereto during the access window. The operation of each of these registers will be described hereinbelow.

Referring further to FIG. 7, the general operation of each of the fields in the protocol shift register will be described. The function field block 128 as described above, is operable to provide a signal that will indicate if a Read or a Write operation is to occur. In addition, the function field circuit 128 determines when the end of the fifty-six bit protocol word is loaded into the protocol shift register. When the fifty-sixth bit is loaded in, a signal is output on a line CLK56B for input to the CRC register 136 to inhibit further loading of data in the internal registers therein. Since data is continuously loaded in through the DQIN line, it is necessary to inhibit further shifting of data through the protocol shift register. A global protocol RESET input PRESB is provided for resetting the entire protocol shift register with a protocol clock and the inverse thereof represented by signals PCK and PCKB, respectively, provided for generating the clocking signal for shifting data through the protocol shift register.

As described above, the data field for the function field block 128 is eight bits wide. Within these eight bits is encoded a Read instruction or a Write instruction. The function field block 128 determines whether the Read instruction is present or the Write instruction is present. If the Read instruction is present, a signal is output on a READMAT line, and if a Write instruction is present, a signal is output on a WRITEMAT line, both lines being input to the control field block 132. The serial input to the function field block 128 is received on an A$\phi$ input.

When the last bit of the protocol word is loaded into the protocol shift register, the clock is delayed by a predetermined amount of time to allow the information to be examined and the proper functions to be output. This signal is output on a line DELCLK when put to the control field block 132. In addition, a pulse is generated at the end of the loading operation for the protocol shift register and output on a line LOADCNT, which signal is input to the address field block 130 and to a control signal block 138. The LOADCNT signal indicates the end of the loading operation for the protocol shift register and enables the address stored in the address field block 130 to be loaded into an internal counter therein. A signal BCEN is provided for output from the function field block 128 to the input of a four-bit counter 140 to initiate the count thereof. The signal BCEN is generated eight clock cycles prior to completion of the loading of the protocol shift register such that the count bits BC$\phi$-BC2 that are stored in the arbitration byte 38 reflect a count value that can be examined by the parallel port. This is necessary during interleaved operation in order to allow the parallel port to determine if the serial port is active when the initial serial operation is a Read. On a Read operation, the initial address is immediately output from the address field block 130 at the end of loading the protocol word. This allows transfer of data from bus 34 to the eight-bit shift register 122 and serial output on the DQ data line 64 on the falling edge of the next eight clocks of the serial clock. The parallel CPU 24 needs to know that the transfer of data from RAM 12 will occur at the end of the protocol word loading operation. Incrementing of the bits C$\phi$-C2 in the arbitration byte 38 eight cycles prior to completion of the protocol shift register loading operation provides this information.

The address field block 130 is comprised in part of a serial shift register for storing a nineteen-bit address for parallel output to an internal counter. The counter is operable to be loaded by the LOADCNT signal and then output the contents thereof to the address bus 32. The counter is then operable to be incremented at the end of every byte by a signal BYTEPUL. The internal counter can only be incremented in the presence of a normal Read signal NR or a normal Write signal NW indicating a Read or Write operation. Further, there is another function providing for a compressed READ/WRITE/READ operation wherein the arbitration byte is queried. A control signal QARBBY provides this query, and during the query, incrementing of the counter is inhibited. This occurs whenever the serial port is examining the contents of the arbitration byte 38 such that the contents of the internal counter are not disturbed. The SARBAD signal (set arbitration address signal) is an input signal from the control field block 132 that determines the setting of the arbitration address to all zeroes or all ones.

The control field block 132 receives a five-bit control field, which field is decoded to provide the various control signals in addition to receiving signals from the other blocks in the protocol shift register for decoding thereof. The control field block 132 generates the NW and NR signals for the normal Read and Write operation after it is determined that there is a Read and Write match from the function field block 128. Additionally, the control field block 132 is operable to control the Read and Write operation to the cartridge select block 134 and also the Read operation of the CRC register 136. To write to the cartridge select block 134, a Write command WNVR is operable to control the cartridge select block 134 to connect an internal nonvolatile memory to the DQIN line. Thereafter, the next sixteen bits input thereto are stored as an internal identification code. In another mode, it may be desirable to read the contents of the nonvolatile memory in the cartridge select block 134. The RNVR signal is then generated and the contents of the nonvolatile memory are loaded in two groups of eight bits each onto the parallel port of the eight-bit shift register 122 for output through the output driver 126 on the next sixteen clock cycles.

The contents of a CRC register 136 are controlled by a signal RCRCR which is input to the output driver 126. The CRC register 136, as will be described hereinbelow, contains a serial shift register that is eight bits wide which is disposed in serial with the protocol word. At the end of a Read or a Write operation, the contents of the CRC register 136 are automatically loaded into the eight-bit shift register 122 and, if it is desirable to read this information, another command sequence is issued that generates the RCRCR signal. The contents of the eight-bit shift register 122 are shifted out through the output driver 126 to the DQ line 64.

A signal DQOE is generated representing the Output Enable signal for a Read operation on line 66. This is utilized in a four wire system wherein the serial CPU 28 requires status information to enable it to tri-state its transmit/receive port such that it is ready to receive data from the arbiter 10.

A cartridge match signal (CARTMAT), a CRC match signal (CRCMAT) and the delayed clock signal (DELCLK) are all received and utilized to generate a Master Enable signal (ME). This is an indication that the protocol shift register is loaded and ready, that the CRC register 136 provides a match, the ID matches in the cartridge select block 134, and a valid command has been received.

The control field block 132 also decodes a signal CWE for compressed Write Enable and a signal MASKRD for a Masked Read function. Outputs C$\phi$, C1 and C2 constitute the least significant bit and the following two bits of the control field. These are utilized in the Masked Read operation, which bits are decoded in the cartridge select block 134. A signal READNVB is provided for output to the cartridge select block 134 when the nonvolatile memory containing the prestored ID is read. This signal forces the CARTMAT signal to a high, indicating that there is an ID match in the cartridge select block 134. Otherwise, operation would be inhibited and no Master Enable signal ME would be generated. The input to the control field block 132 is the CARID$\phi$ input.

The cartridge select block 134 has an internal storage register referred to as a nonvolatile memory which is interfaced with the eight-bit shift register 122 on the parallel input thereto through a bus 142 to allow data stored therein to be read out. Additionally, the cartridge select block 134 contains a sixteen-bit shift register which is a portion of the fifty-six bit protocol word and is operable to store the identification code that is to be compared with the contents of the nonvolatile memory. A true comparison results in a high logic signal on the CARTMAT output. A DQIN input is provided for interfacing the input of the internal nonvolatile memory with the DQIN input pin on line 62, whereas the internal shift register has the input thereof connected to the CRCDEL output of the CRC register 136. Therefore, the cartridge select block 134 is operable to have the nonvolatile memory therein written to or read from, and also receive the sixteen-bit cartridge match field for comparison with the ID stored in the internal nonvolatile memory.

The CRC register 136 is operable to receive the eight-bit CRC field in the fifty-six bit protocol word and process this information in accordance with a predetermined cyclic redundancy check algorithm to determine if there is a match, which signal is output on the CRCMAT line. In addition, the contents of the register can be read out to the parallel input of the eight-bit shift register 122 on a bus 144, as described above.

The control signal block 138 is operable to output the Output Enable signal, Chip Enable signal and Write Enable signal at the end of each byte of data. During operation wherein data is being read from the memory, a BYTEPUL signal is generated by the four-bit counter 140 at the beginning of each byte to load the eight-bit shift register 122. During a Write, BYTEPUL signal is generated at the end of each byte to indicate the eight-bit shift register 122 as being full. This pulse, in conjunction with the NR and NW signals, results in the generation of the signals on the system control lines 84 for enabling data transfer. In addition, the control signal block 138 outputs loading signals to the eight-bit shift register 122 to enable the eight-bit shift register 122 to load data in from the cartridge select block 134 or the data bus 34. The load signal LDNVRB is generated when the contents of the nonvolatile memory in the cartridge select block 134 are to be loaded into the eight-bit shift register 122 and a load signal LDBYTEB is generated when the data on the data bus 34 is to be loaded into the eight-bit shift register 122.

During operation of the control signal block 138, it is important during a Read operation that the information from the RAM 12 be transferred into the eight-bit shift register 122 prior to serially shifting out data of the first full byte from shift register 122. Therefore, the signal LOADCNT is utilized by the control signal block 138 to load the initial value of data into the eight-bit shift register 122 immediately after the protocol word is loaded. Thereafter, the BYTEPUL signal controls loading.

In operation, the fifty-six bit protocol word is first loaded into the protocol shift register. When the protocol word is loaded, the control field block 132 determines if the CARTMAT output, indicating an ID match, and the CRCMAT signal, indicating no errors, are both high. After the predetermined amount of delay provided by the DELCLK signal, the Master Enable signal ME is then generated which enables the eight-bit shift register 122 and the four-bit counter 140 to allow reading or writing of data from the RAM 12. The Read or Write function is first determined by the function field block 128 and then the address loaded into the internal counter in the address field block 130. This address is then output therefrom to the address multiplex/detect circuit 70 for input to the RAM 12. This is in response to the LOADCNT signal. At the same time, data on the data bus 34 is loaded into the eight-bit shift register 122 on a Read operation and then output through the output driver 126 to the DQ line 64. On a Write operation, the eight-bit shift register 122 is first loaded and then shifted out to the data bus 34 in response to generation of the BYTEPUL signal by the four-bit counter 140. This continues until the Read or Write function is completed. During this time, the four-bit counter 140 generates the count value BC$\phi$-BC2 on the line 68 for input to the arbitration byte 38.

CRC Register

Figure 8:
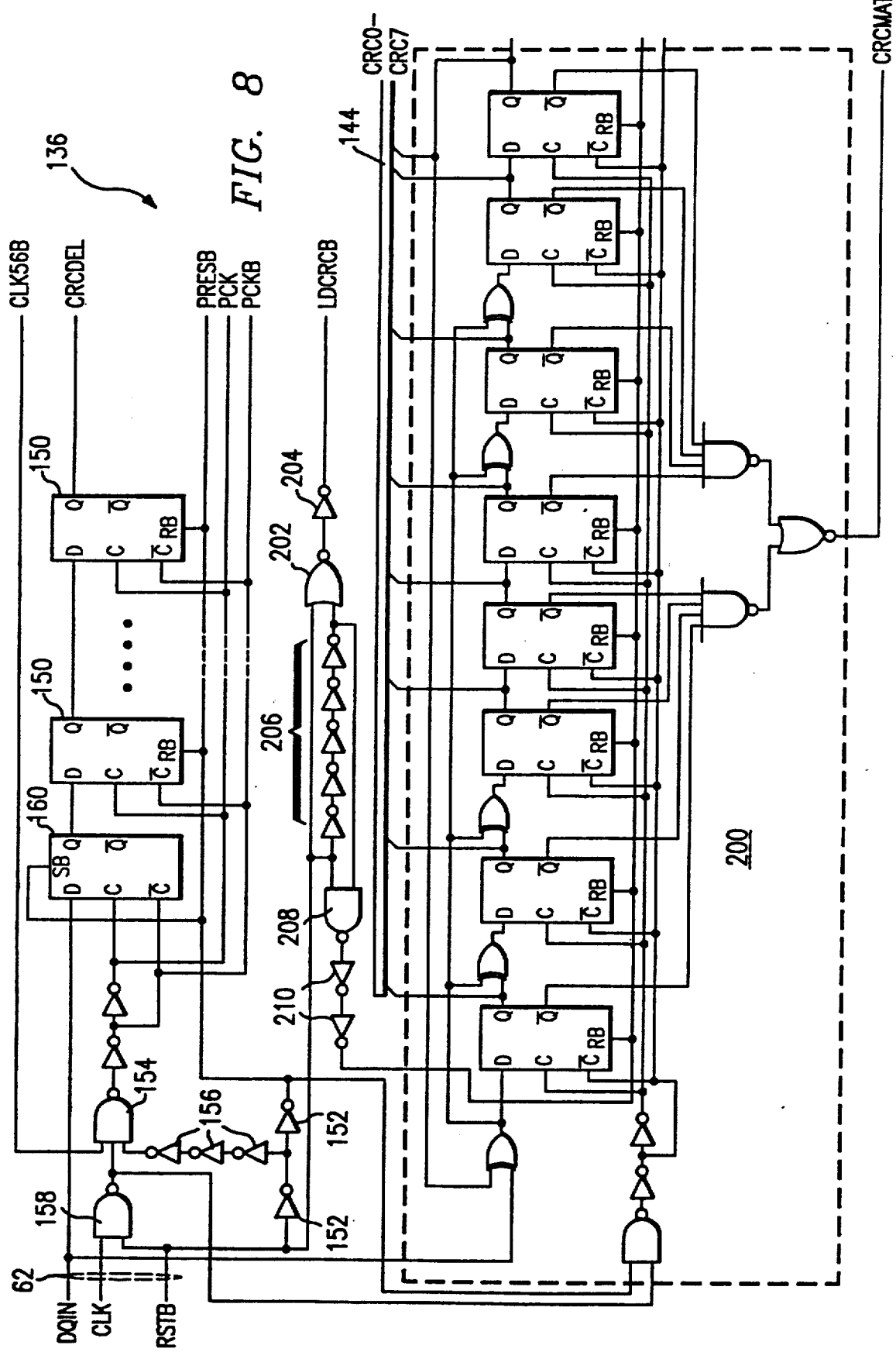
FIG. 8 illustrates a logic diagram of the CRC register.

Referring now to FIG. 8, there is illustrated a logic diagram of the CRC register 136, wherein like numerals refer to like parts in the various figures. An eight-bit shift register is provided with seven serially connected D-type flip flops 150, each flip flop 150 having the input thereof connected to the Q-output of the previous flip flop in the string. The Q-output of the final flip flop 150 in the shift register provides the CRCDEL signal for input to the cartridge select block 134.

The reset input of the flip flops 150 are all connected together and to the RSTB signal on line 62 through two invertors 152. The clock and clock-bar inputs are connected to the output of a three input NAND gate 154, one input of which is connected to the CLK56B signal, one input of which is connected through three invertors 156 and one of the invertors 152 to the RSTB input and the other input of which is connected to the output of a two input NAND gate 158. The NAND gate 158 has one input thereof connected to the CLK signal and the other input thereof connected to the RSTB signal. The NAND gate 158 and the NAND gate 154 provide a clock signal which is inhibited upon the generation of the CLK56B signal indicating the end of a loading operation for the protocol shift register. Therefore, the clock operates only in the presence of a high on the CLK56B line and a logic high on the RSTB line. The reset signal PRESB, the clock signal PCK and the inverse thereof are generated by the gating circuit comprised of the NAND gates 154 and 158 and the invertors 152 and 156.

The input to the first flip flop 150 in the eight-bit shift register is connected to the Q-output of a D-type flip flop 160. In the protocol shift register, the Q-output of the flip flop 160 is connected to the D-input of the first flip flop 150 in the shift register and the D-input of the flip flop 160 is connected to the DQIN terminal. When the flip flops 150 are reset to zero on the reset input thereof, the flip flop 160 is set to a logic "1" with the set input thereof being connected to the reset inputs of the flip flops 150 and to the reset signal RSTB through invertors 152. Therefore, upon loading of the protocol shift register, a "1" is always pushed through the shift register. The CLK56B signal is generated when this "1" is detected at the end of the field.

The CRC error detection function is provided by a circuit 200 that determines whether there are any errors in accordance with a predetermined cyclical redundancy check algorithm. The circuit 200 provides a parallel output of the contents thereof on a bus 144 for output to the eight-bit shift register 122.

The LDCRCB signal is provided with a pulse generating circuit comprised of a two-input NOR gate 202 disposed in series with an invertor 204, one input of the NOR gate 202 connected to the RSTB signal and the other input thereof connected to the RSTB signal through five series-connected invertors 206. The pulse is generated on the falling edge of the RSTB signal. The output of the series connected invertors 206 is also input to one input of a NAND gate 208, the input of which is connected to the signal RSTB and the output of which is connected through two series-connected invertors 210 of the circuit 200 to provide a pulse on the rising edge of the RSTB signal to reset the CRC circuit 200 prior to sending the first bit of the protocol.

Cartridge Select Block

Figure 9:
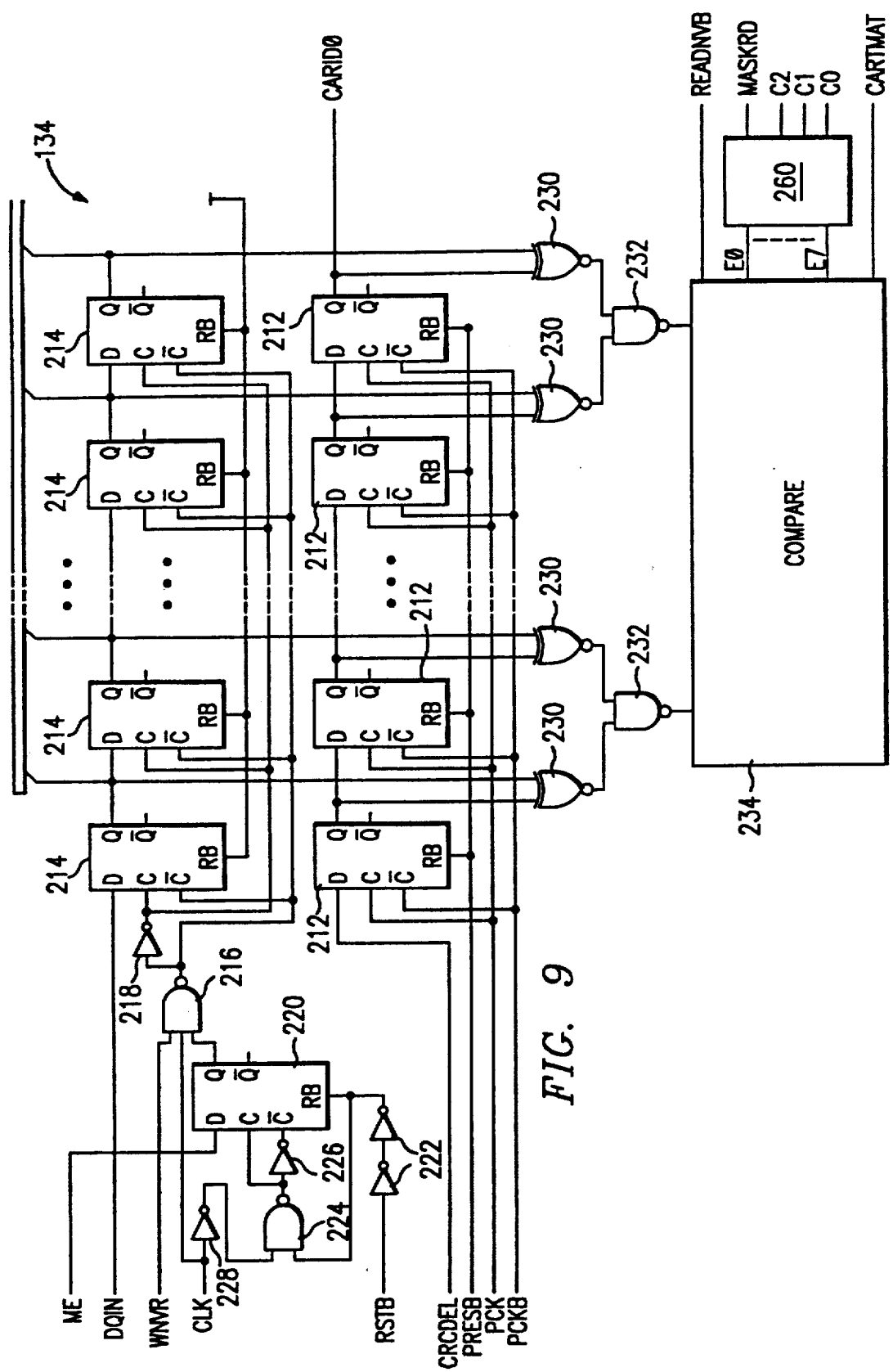
FIG. 9 illustrates a logic diagram of the cartridge select block.

Referring now to FIG. 9, there is illustrated a logic diagram of the cartridge select block 134, wherein like numerals refer to like parts in the various figures. The cartridge select block 134 is comprised generally of a sixteen-bit serial shift register disposed between the input CRCDEL and the output CARID$\phi$. The shift register is comprised of sixteen individual D-type flip flops 212, each having the D-input thereof connected to the Q-output of the previous flip flop 212. The clock input is connected to the PCK input and the clock-bar input is connected to the PCKB input with the reset input connected to PRESB. The first flip flop 212 in the shift register has the D-input thereof connected to the CRCDEL input and the last flip flop 212 in the shift register has the Q-output thereof connected to the CARID$\phi$ output.

The cartridge select block 134 also contains a sixteen-bit nonvolatile register comprised of D-type flip flops 214. Each of the flip flops 214 has the D-input thereof connected to the Q-input of the previous flip flop and the D-input of the most significant bit (MSB) connected to the DQIN input. The reset input of each of the flip flops 214 is connected to a positive voltage. The clock input of each of the flip flops 214 is connected to the output of a NAND gate 216 through an invertor 218, and the clock-bar input of each of the flip flops 214 is connected to the output of the three input NAND gate 216. The NAND gate 216 has one input thereof connected to the WNVR input associated with the Write Nonvolatile Memory command, the second input thereof connected to the CLK input which, as described above, is the system clock that is not inhibited in the CRC register 136, and the third input thereof connected to the Q-output of a D-type flip flop 220. The D-input of flip flop 220 is connected to the Master Enable signal ME with the reset input thereof connected through two invertors 222 to the RSTB input. The clock input of flip flop 220 is connected to the output of a two input NAND gate 224 and the clock-bar input thereof is also connected to the output of NAND gate 224 through an invertor 226. One input of NAND gate 224 is connected to the output of the invertors 222 and the other input thereof is connected through an invertor 228 to the CLK signal. In operation, the CLK signal is inhibited from passing through the NAND gate 216 until both the WNVR signal is generated and the ME signal is generated. The flip flop 220 is operable to clock the ME signal through on the rising edge of the CLK signal. In this manner, the contents of the nonvolatile memory stored in the flip flops 214 is protected until the WNVR signal and the ME signal are generated. At that time, data can be shifted in from the DQIN input into the flip flops 214 to provide the predefined identification code that is stored in a cartridge select block 134 for later comparison to the received identification code.

The Q-outputs of each of the sixteen flip flops 214 is connected to one output line of the bus 142 labelled NV$\phi$ through NV15. These output lines are arranged such that the first eight bits associated with lines NV$\phi$-NV7 are selectively interfaced with the eight inputs of the eight-bit shift register 122. Thereafter, the next eight bits associated with output lines NV8-NV15 are interfaced with the same eight bits in the eight bit shift register 122. Since there are sixteen bits, when reading the nonvolatile memory, it is necessary to first load the eight bits associated with outputs lines NV$\phi$-NV7 into the eight-bit shift register 122 and then transfer them out of the shift register 122 followed by loading in of the next eight bits associated with output lines NV8-NV15. This operation will be described hereinbelow with reference to the detailed operation of the eight-bit shift register 122.

The Q-output of each of the flip flops 214 is input to one input of an Exclusive NOR gate 230, the other input of the Exclusive NOR gate 230 being connected to the Q-output of the associated one of the flip flops 212 in the serial shift register. If both of the bits match, the output of the Exclusive NOR gate 230 is a logic "1" to indicate a match. Thereafter, the outputs of the Exclusive NOR gates 230 for each of the associated flip flops 212 in the serial shift register and the flip flops 214 in the nonvolatile register are compared to determine if there is a match in all sixteen bits. In the preferred embodiment, adjacent bits have the outputs of the associated Exclusive NOR gates 230 connected to the inputs of a two-input NAND gate 232, the output of which is connected to the input of a compare circuit 234. This results in reduction of the input to the compare circuit 234 to eight. Compare circuit 234 utilizes combinatorial logic to determine if eight logic lows are present on the eight outputs of the NAND gates 232. The compare circuit 234 also receives the READNVB input which is utilized to force the CARTMAT signal to a logic high during reading of the nonvolatile memory comprised of flip flops 214.

The cartridge select block 134 also provides for a Masked Read function which is utilized to determine a match on only two of the bits at a time. This is utilized to determine in a very short amount of time if a given ID exists on one of a plurality of devices utilizing the cartridge select logic block 134. By loading the ID into all of the devices and then only comparing two bits and then four bits, six bits, eight bits, ten bits, twelve bits, fourteen bits, sixteen bits, it can easily be determined which IDs are in the system by exhaustively searching all four combinations of two bits, fixing those two bits and searching all four combinations of the next two bits, etc. This results in a much faster elimination process.

The Masked Read operation utilizes the three least significant bits C$\phi$, C1 and C2 in the control field, which bits are input to an enable decode circuit 260 which outputs enable signals E$\phi$-E7. Enable signals E$\phi$-E7 are operable to force the compare circuit 234 to a match condition for one to seven of the eight outputs of NAND gates 234 and that one pair to seven pairs of bits is examined.

Control Field Block

Figure 10:
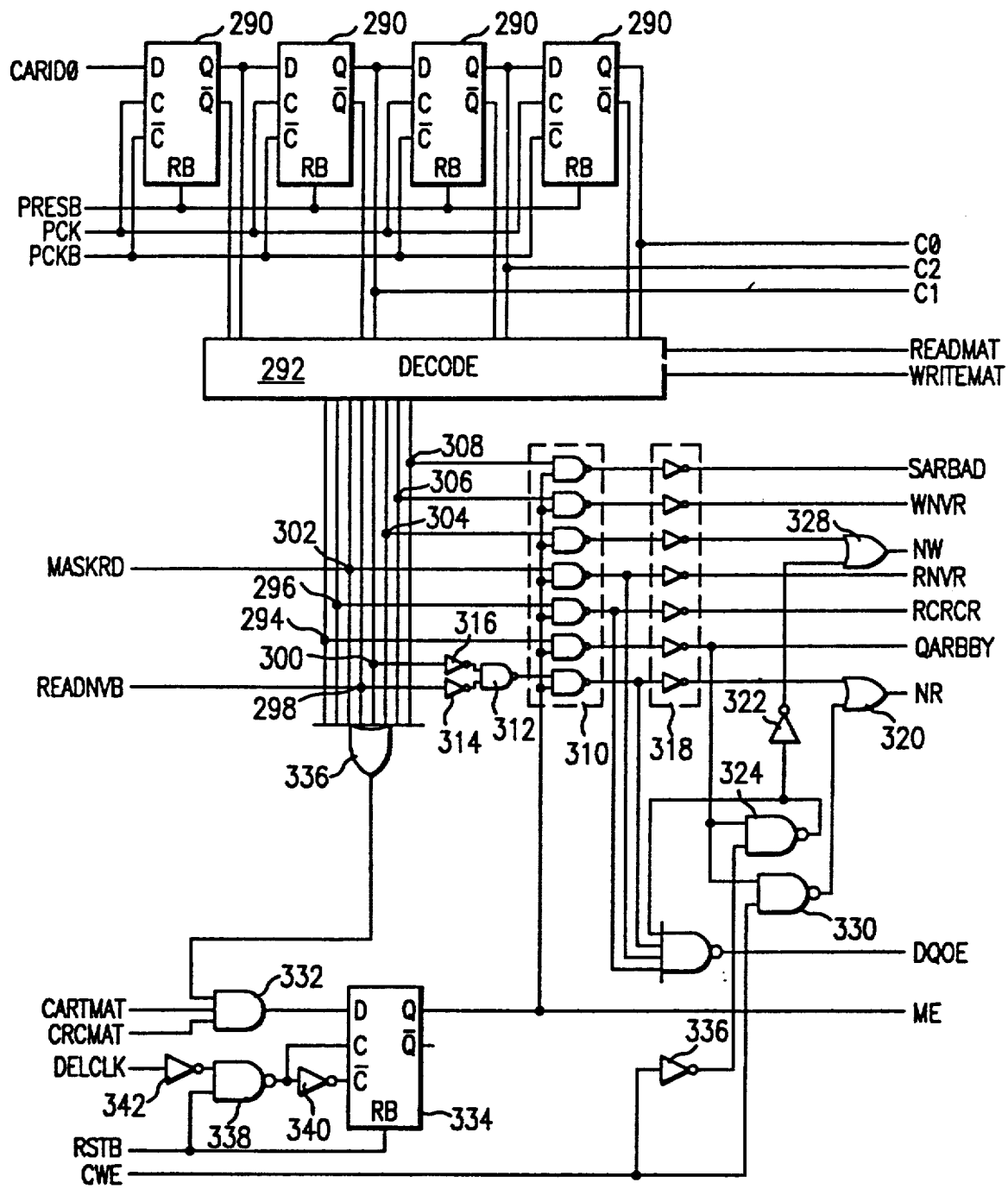
FIG. 10 illustrates a logic diagram of the control field block.

Referring now to FIG. 10, there is illustrated a logic diagram of the control field block 132 in the protocol shift register. The control field block 132 is generally comprised of five D-type flip flops 290, each having the D-input thereof connected to the Q-output of the preceding flip flop in the shift register string with the D-input of the first flip flop 290 comprising the most significant bit and having the input thereof connected to the CARID$\phi$ input and the last flip flop 290 in the shift register comprising the least significant bit and having the Q-output thereof connected to the C$\phi$ output terminal. The clock input of each of the flip flops 290 is connected to the PCK input with the clockbar input thereof being connected to the PCKB input. The resets of all of the flip flops 290 are connected to the PRESB input. The Q-outputs comprise the control bits C$\phi$-C4.

The Q- and Q-bar outputs of flip flops 290 for the bits C$\phi$-C4 are input to a decode block 292 which is operable to generate eight decoded outputs corresponding to eight separate commands. Each of these commands is determined by the contents of the control field. The READMAT and WRITEMAT signals from the function field block 128 are input to the decode block 292 as two additional signals for the decode function provided by the decode block 292. The eight outputs are labelled with reference numerals 294 through 308. The output 294 corresponds to the compressed READ/WRITE/-READ operation, the output 296 corresponds to the Read operation for the CRC register 136, the output 298 corresponds to the Masked Read operation, the output 300 corresponds to the Normal Read operation, the output 302 corresponds to the reading of the nonvolatile register in the cartridge select block 134, the output 304 corresponds to the Normal Write operation, the output 306 corresponds to the Write operation for the nonvolatile register in the cartridge select block 134 and the output 308 corresponds to the operation to set the arbitration address (SARBAD).

Each of the outputs 294, 296 and 302-308 are input to one of seven NAND gates 310 with the outputs 298 and 300 each input to one of two inputs on a NAND gate 312 through invertors 314 and 316, respectively. The output of NAND gate 312 is input to the last of the NAND gates 310. The other inputs of the NAND gate 310 are connected to the Master Enable signal ME such that the output of NAND gates 310 requires the presence of ME to generate the commands. However, the Masked Read signal MASKRD and the READNVB signal do not require gating by the Master Enable signal.

Each of the outputs of the NAND gates 310 are inverted through a bank of invertors 318, with the invertor 318 associated with output 308 providing the SARBAD signal, the invertor 318 associated with the output 306 providing the WNVR signal, the invertor 318 associated with the output 302 providing the RNVR signal, the output of invertor 318 associated with the output 296 providing the RCRCR signal and the invertor 318 associated with the output 294 providing the QARBBY signal. The output of the invertor 318 associated with the output of NAND gate 312 is input to one input of an OR gate 320, the other input of which is connected through an invertor 322 to the output of a NAND gate 324. The NAND gate 324 has one input thereof connected to the QARBBY output and the other input thereof connected through an invertor 326 to the Compressed Write Enable output (CWE). In a similar manner, the invertor 318 associated with the output 304 is input to one input of an OR gate 328, the other input of which is connected to the output of a NAND gate 330. The NAND gate 330 has one input thereof connected to the QARBBY signal and the other input thereof connected to the CWE signal. The output of OR gate 320 provides the normal Read signal NR and the output of the OR gate 328 provides the normal Write signal NW. The logic functions for the signals in the various control fields are illustrated in Table I as a function of the five-bit control field C$\phi$-C4.

TABLE I

| COMMAND | LOGIC FUNCTION |
|---------|----------------|
| SARBAD  | WRITE*10110*ME |
| WNVR    | WRITE*01110*ME |
| NW      | WRITE*10001*ME or CWE*ME |
| RNVR    | READ*00101*ME |
| NR      | READ*00110*ME or READ*11XXX*ME or CWE-BAR*ME |
| RCRCR   | READ* 00011*ME |
| QARBBY  | WRITE*01001*ME |
| READNVB | READ*00101 |
| MASKRD  | READ*11XXX |

The signals CARTMAT and CRCMAT are input to one input of a three input AND gate 332, the output of which is connected to the D-input of a D-flip flop 334. The remaining input of the AND gate 332 is connected to the output of an eight-input OR gate 334. Each of the inputs of the OR gate 336 is connected to an associated one of the outputs 294-308 of the decode circuit 292. The OR gate 336 is operable to have the output thereof disposed at a logic high in the presence of at least one valid command. If at least one valid command is not present, the output of OR gate 336 is low and AND gate 332 will be inhibited such that the D-input to flip flop 334 is low. The clock input to the flip flop 334 is connected to the output of a NAND gate 338 and the clock-bar input is connected to the output of NAND gate 338 through invertor 340. The NAND gate 338 is connected on one input through an invertor 342 to the DELCLK signal and the other input thereof is connected to the RSTB signal and also connected to the reset input of the flip flop 334. In operation, when the input signals CARTMAT and CRCMAT are valid and a valid command is present in the control field, the Master Enable signal is generated on the rising edge of the DELCLK signal after the appropriate command is generated. It is important to note that the READNVB and MASKRD signals are generated prior to generation of the ME signal. In addition, the first three bits C$\phi$-C2 are output to the cartridge select block 134.

Address Field Block

Figure 11:
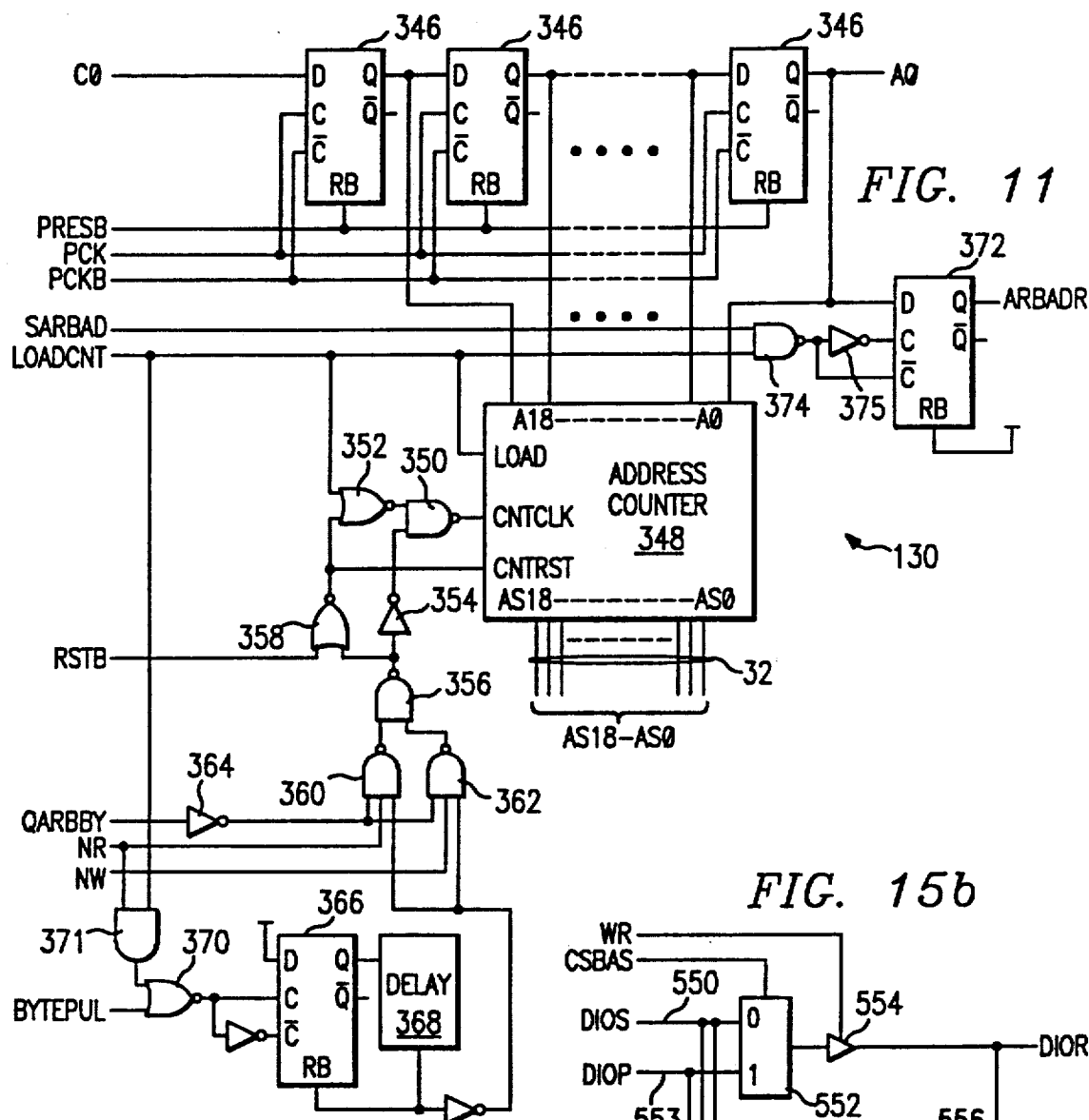
FIG. 11 illustrates a logic diagram of the address field block.

Referring now to FIG. 11, there is illustrated a logic diagram of the address field block 130. Generally, the address field is shifted in and stored in a nineteen-bit shift register. The shift register is comprised of nineteen D-type flip flops 346. Each of the flip flops 346 in the shift register has the D-input thereof connected to the Q-output of the preceding one of the flip flops with the last of the flip flops 346 in the shift register having the Q-output thereof connected to the A$\phi$ output and the first of the flip flops 346 in the shift register having the D-input thereof connected to the C$\phi$ input. The clock inputs of all of the flip flops 346 are connected to the PCK signal and the clockbar inputs are connected to the PCKB signal. The reset input is connected to the PRESB signal.

The outputs of the flip flops 346 provide the address signals A$\phi$-A18, which are input to the parallel input of a sequential address counter 348. The address counter 348 has a load input connected to the LOADCNT input to load the value of the nineteen bit shift register therein for output on the bus 32. After loading, a signal is input to a count input CNTCLK for incrementing the counter 348. The CNTCLK input is connected to the output of a NAND gate 350, one input of which is connected to the output of a NOR gate 352 and the other of which is connected through an invertor 354 to the output of a NAND gate 356. The reset input RSTB is connected through a two-input NOR gate 358 to the CNTRST input for the reset operation in the counter 348, the other input of NOR gate 358 being connected to the output of the NAND gate 356. The NOR gate 352 has one input thereof connected to the reset input on the counter 348 and the other input thereof connected to the LOADCNT signal. The NOR gate 352 and NAND gate 350 operates to force the CNTCLK input to a "1" for a reset or load operation.

The NAND gate 356 has one input thereof connected to the output of a three-input NAND gate 360 and the other input thereof connected to the output of a three input NAND gate 362. One input of each of NAND gates 360 and 362 is connected through an invertor 364 to the QARBBY input. One input of NAND gate 360 is connected to the NR signal and one input of NAND gate 362 is connected to the NW signal. One input of NAND gate 360 and one input of NAND gate 362 are connected together and to the Q-output of a flip flop 366 through six series connected invertors 368. The output of the fifth invertor in the string 368 is connected to the reset input of the flip flop 366 and the D-input thereof is connected to the positive power supply voltage. The clock and clock-bar inputs are connected to the output of a NOR gate 370, one input of which is connected to the BYTEPUL signal and the other input thereof connected to the output of an AND gate 371, one input of which is connected to NR and the other of which is connected to the LOADCNT signal. Therefore, the LOADCNT signal in the presence of the NR signal during a Read operation and the BYTEPUL signal operate to clock the flip flop 366. As described above, this allows the initial address loaded into the counter 348 on a Read operation to be output the address to the RAM 12 immediately after loading of the protocol word. Accessed data is then loaded into the eight-bit shift register 122. It is necessary to use the LOADCNT signal since the BYTEPUL signal does not occur until after the first full byte has occurred. The flip flop 366 outputs a pulse that has a duration equal to the delay provided by the five invertors in the string 368, this pulse being delayed through the last of the invertors for input to the NAND gates 360 and 362 to clock the address counter 348, depending on the state of the NR, NW and QARBBY signals.

The arbitration address signal ARBADR is provided from the output of a D-type flip flop 372, the D-input of which is connected to the A$\phi$ address and the clock input of which is connected through an invertor 375 to the output of a NAND gate 374. NAND gate 374 has one input thereof connected to the LOADCNT input and the other input thereof connected to the SARBAD input. The reset input of flip flop 372 is connected to the positive supply. Therefore, when the SARBAD signal is present from the control field block 132, the logic state of the Aφ address in the address field is clocked through to the Q-output of flip flop 372. As described above, this determines whether the address location of the arbitration device is all ones or all zeroes.

Function Field Block

Figure 12:
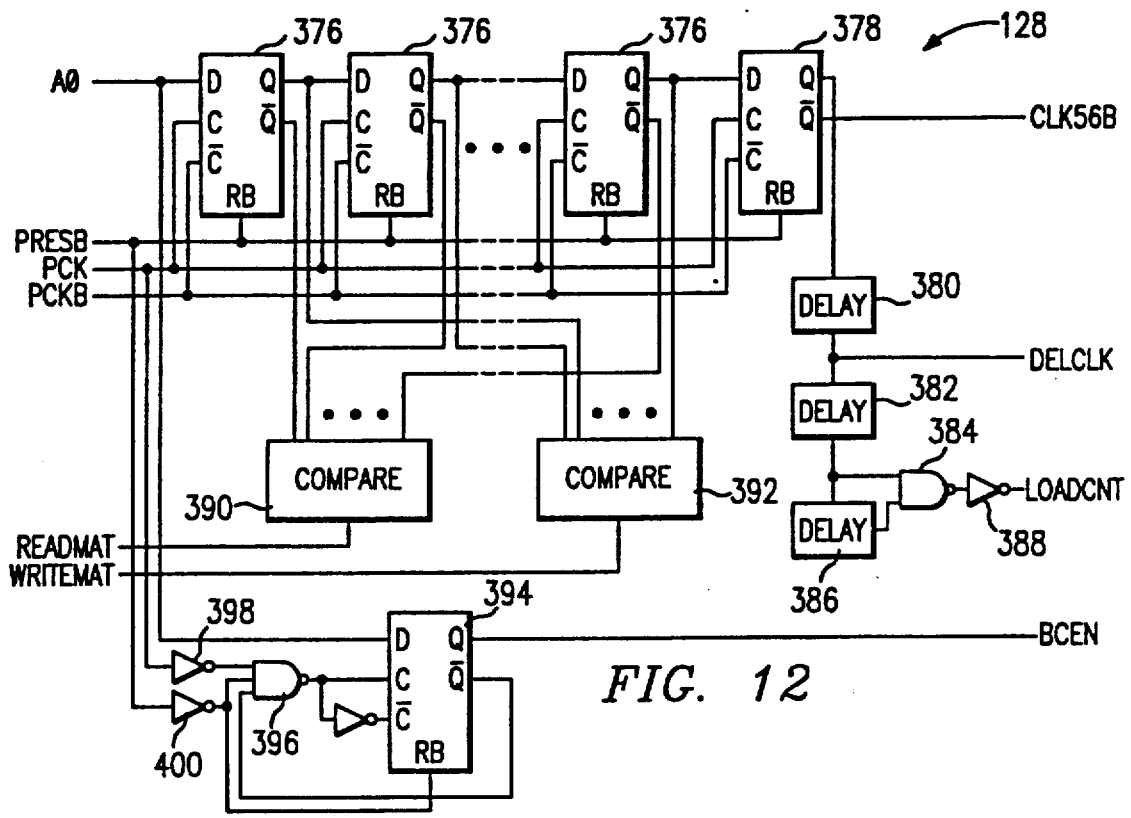
FIG. 12 illustrates a logic diagram of the function field block.

Referring now to FIG. 12, there is illustrated a logic diagram of the function field block 128. As described above, the function field is eight bits wide and is stored in an eight-bit shift register. The eight-bit shift register is comprised of eight D-type flip flops 376. Flip flops 376 have the D-input thereof connected to the Q-output of the previous flip flop with the input of the first flip flop 376 in the shift register being connected to the Aφ input and the output of the last of the flip flops 376 having the Q-output connected to the D-input of a D-type flip flop 378. The clock inputs of flip flops 376 and flip flop 378 are connected to the PCK input with the clock-bar inputs thereof connected to the PCKB input. All of the reset inputs of flip flops 376 and the flip flop 378 are connected to the PRESB signal.

The Q-output of flip flop 378 is connected to the input of a delay circuit 380, the output of which comprises the delay clock signal (DELCLK). The DELCLK signal is also input through a second delay 382, the output of which is input to one input of a NAND gate 384, the other input of which is connected to the output of delay clock 382 through another delay 386, delay 386 providing a pulse output from NAND gate 384 which is input to an invertor 388 to provide the LOADCNT signal on the output thereof. The Q-bar output of flip flop 378 provides a CLK56B output. As described above, there is always a logic "1" bit that precedes the data shifted into the protocol shift register. When this bit enters the D-flip flop 378, the Q-output goes high and the Q-bar output goes low. The delay clock (DELCLK) signal is generated after the delay of delay 380 with the LOADCNT signal generated after a predetermined amount of time determined by the delay 382.

The Q- and Q-bar outputs of the flip flops 376 are selectively input to either a compare circuit 390 or a compare circuit 392. When all of the bits that are input to either the compare circuit 390 or the compare circuit 392 are a logic "1", the respective output thereof is high. The output of the compare circuit 390 comprises the Read Match signal READMAT and the output of the compare circuit 392 comprises the Write Match signal WRITEMAT.

The BCEN signal is generated on the output of a flip flop 394. The D-input of which is connected to the Aφ input. The clock input of flip flop 394 is connected through a three-input NAND gate 396 which has one input thereof connected through an invertor 398 to the PCK signal, one input thereof connected through an invertor 400 to the PRESB signal and the other input of which is connected to the Q-bar output of flip flop 394. The output of invertor 400 is also connected to the reset input of flip flop 394. Flip flop 394 is operable to generate the BCEN signal on the rising edge of the PCK signal when Aφ is equal to "1" after being reset by the global preset signal PRESB on the forty-eighth rising edge after RST-bar goes high, one byte before shifting last of the fifty-six protocol bits.

Eight-Bit Shift Register

Figure 13:
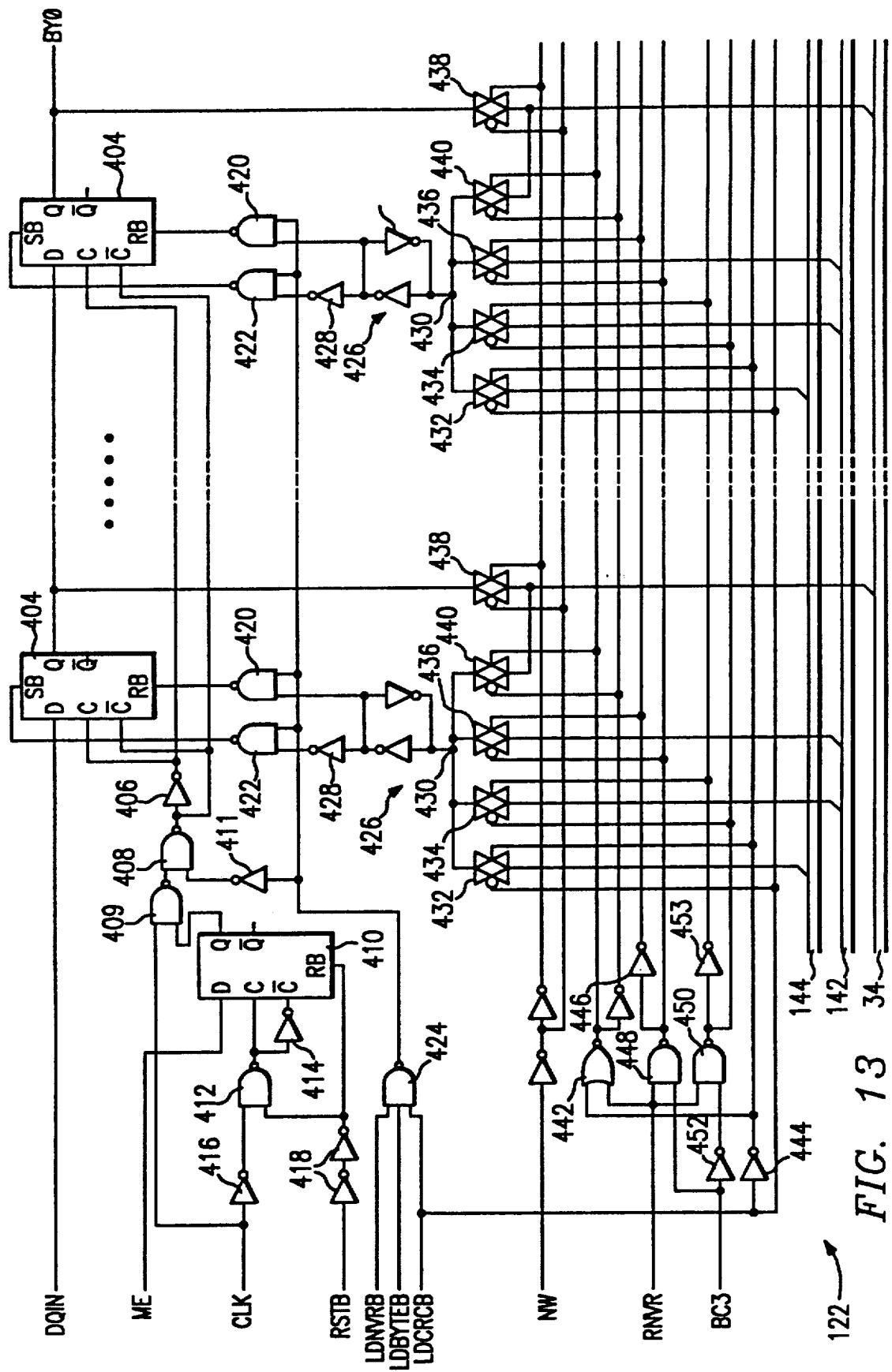
FIG. 13 illustrates a logic diagram of the eight-bit shift register.
Figure 15A:
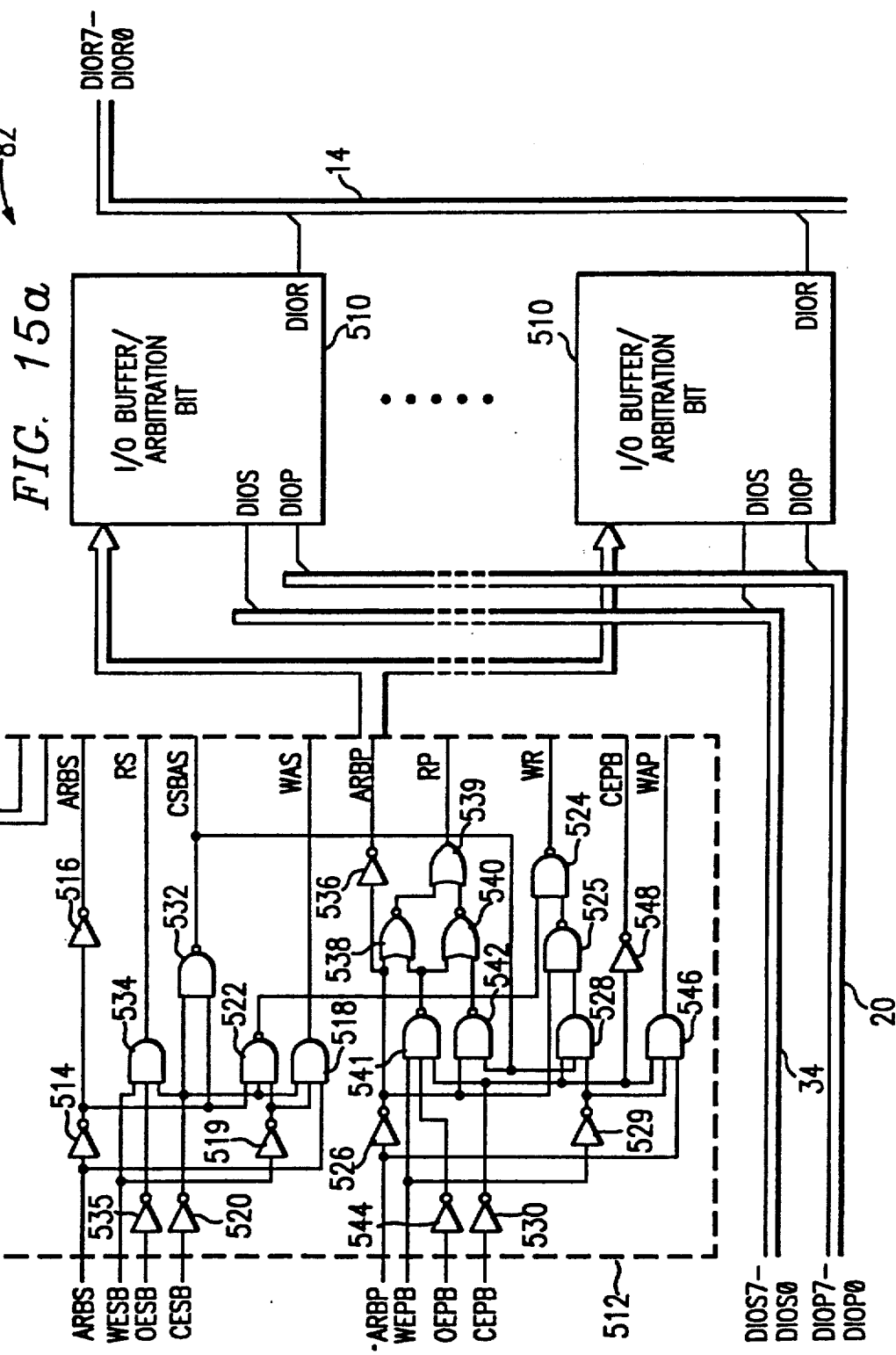

Referring now to FIG. 13, there is illustrated a logic diagram of the eight-bit shift register 122. Shift register 122 is generally comprised of eight D-type flip flops 404 connected as a serial shift register with the D-input of each of the flip flops 404 connected to the Q-output of the previous flip flop 404. The D-input of the first flip flop 404 in the shift register is connected to the DQIN input and the Q-output of the last flip flop 404 in the shift register is connected to the BYφ output. The clock inputs of flip flops 404 are connected through an invertor 406 to the output of a two-input AND gate 408 and the clock-bar inputs are connected to the output of the AND gate 408. One input of AND gate 408 is connected to the output of a two-input NAND gate 409, and the other input of which is connected to the output of an invertor 411, the input of which is connected to the signal LOADSR2. The NAND gate 409 has one input thereof connected to the Q-output of a flip flop 410 and the other input thereof connected to the CLK signal. The flip flop 410 has the D-input thereof connected to the Master Enable signal ME and the clock inputs thereof connected to the output of a NAND gate 412 with an invertor 414 inverting the output of NAND gate 412 for input to the clock-bar input. NAND gate 412 has one input thereof connected through an invertor 416 to the CLK signal and the other input thereof connected through two series connected invertors 418 to the RSTB input. Flip flop 410 is operable to clock through the ME signal and latch it on the Q-output of flip flop 410 on the edge of the CLK signal such that no shifting occurs until the ME signal is present. Thereafter, the CLK signal clocks the flip flops 404.

Each of the flip flops 404 has the reset input connected to the output of a two-input NAND gate 420. The set input is connected to the output of a two-input NAND gate 422. One input of each of the NAND gates 420 and 422 is connected to the output of a three-input NAND gate 424 which comprises the LOADSR2 signal for loading the shift registers. One input of NAND gate 424 is connected to the LDNVRB input, one input thereof is connected to the LDBYTEB input and the other input is connected to the LDCRCB signal. When any one of these signals goes low, the LOADSR signal goes high to load the shift registers.

The other input of NAND gate 422 is connected to the output of a latch 426 through an invertor 428. Latch 426 is comprised of two invertors configured in a back-to-back configuration. The other input of NAND gate 420 is connected directly to the output of the latch 426. The input of latch 426 is connected to a node 430. Latch 426 is operable to store the data to be loaded into the shift register in response to the LOADSR signal going high.

Node 430 is connected through a transfer gate 432 to one line in the bus 144. The node 430 is also connected to two lines of the bus 144 through the transfer gates 434 and 436, respectively. As described above, during one half of a load operation, one of the lines NVφ-NV7 is loaded into the latch 426 and, during the second half of the load operation thereafter, the associated one of the lines NV8-NV15 is loaded into the latch 426. For example, the first flip flop 404 connected to DQIN illustrated in FIG. 13 comprises the MSB of the shift register. Therefore, on the first operation, the signal on output line NV7 would be loaded into the latch 426 and, thereafter, the signal on output line NV15 would be stored in the latch 426. The associated data line from bus 34 is connected to the Q-output of flip flop 404 through a transfer gate 438 to allow writing thereof and also through a transfer gate 440 to allow reading thereof and storage in the latch 426. The transfer gate 432 is controlled by the LDCRCB input representing the loading operation for the CRC register 136. The transfer gate 440 is controlled to load the latch 426 by the LDRAM signal on the output of a two-input NOR gate 442. NOR gate 442 has one input thereof connected through an invertor 444 to the LDCRCB input and the other input thereof connected to the RNVR input. The transfer gate 440 transfers data to the latch 426 when the LDRAM signal is high and when both inputs of NOR gate 442 are low. The transfer gate 438 is controlled by the NW input.

The two transfer gates 434 and 436 are controlled to sequentially write the lower half and upper half of the sixteen-bit nonvolatile portion of the cartridge select block 134. The eight least significant bits are input to transfer gate 436 and are transferred to latch 426 when the signal LDNVRL is high, which signal is connected through an invertor 446 to the output of a NAND gate 448. NAND gate 448 is connected to the RNVR input and the other input thereof is connected to the BC3 input. Therefore, when both the RNVR signal and the BC3 signal are high, transfer gate 436 is operable to transfer information. The upper half of the sixteen-bit nonvolatile register in the cartridge select block 134 is transferred to latch 426 by transfer gate 434 by the LDNVRM signal. This signal is output from a NAND gate 450 through an invertor 452. One input of NAND gate 450 is connected through an invertor 453 to the BC3 input and the other input thereof is connected to the RNVR signal. When RNVR is high and BC3 is low, the upper half of the non-volatile register in the cartridge select block 134 is transferred to the shift register 122.

Four Bit Counter

Referring now to FIG. 14, there is illustrated a logic diagram of the four-bit counter 140. The four-bit counter is comprised basically of four D-type flip flops 454 arranged in a four-bit counter configuration. The Q-bar output of each of the flip flops 454 is connected to the D-input thereof through a transfer gate 456 and the Q-output thereof is connected to the D-input thereof through a transfer gate 458. A NAND gate 460 is provided having the output thereof connected to the input of an invertor 462 and also connected to the control input of the transfer gate 458, such that the transfer gate 458 connects the Q-output to the D-input when the output of the NAND gate 460 is at a logic high and the output of invertor 462 is low. The output of the invertor 462 is connected to the control input of the transfer gate 456 such that when the output of invertor 462 is always a logic high, the Q-bar output of flip flop 454 is connected to the D-input thereof. The output of invertor 462 is connected to one input of the NAND gate 460 associated with the next sequential flip flop 454 in the counter. For the first bit in the counter, the two inputs of the NAND gate 460 associated therewith are connected to a positive supply such that the output of invertor 462 is a logic high and the Q-bar output thereof is always connected to the D-input. The Q-output therefore comprises the BC$\phi$ output.

In operation, when the Q-outputs of all preceding flip flops 454 go high, the output of NAND gate 460 goes low to connect the Q-bar output of the next of the flip flops 454 for the next bit to the D-input thereof. The outputs BC$\phi$–BC3 provide the count value that is stored in the first field 51 of the arbitration byte 38 which, as described above, provides a count value to determine the end of each byte on the serial port which coincides to the transfer of data to and from the RAM 12, during the access window.

Each of the flip flops 454 have the clock inputs thereof connected to the output of a NAND gate 464 with the clock-bar inputs thereof connected to the output of NAND gate 454 through invertor 466. The reset inputs of flip flops 454 and one input of NAND gate 464 are connected to the RSTB input through two series-connected invertors 468. The other input of NAND gate 464 is connected to the output of a NAND gate 470. NAND gate 470 has one input thereof connected to the Q-output of a flip flop 472 and the other input thereof connected to the CLK signal. Flip flop 472 has the D-input thereof connected to the BCEN signal and the clock input thereof is connected to the output of a NAND gate 474. One input of NAND gate 474 is connected to the CLK signal through an invertor 476 and the other input thereof is connected to the reset input RSTB through invertors 468. The reset input of flip flop 472 is also connected to the reset output of invertors 468. The clock-bar input of flip flop 472 is connected to the output of NAND gate 474 through an invertor 478.

In operation, the NAND gate 470 inhibits operation of the counter until generation of the enable signal BCEN. As described above, the enable signal BCEN is generated one byte prior to the entire fifty-six bit protocol field being loaded into the protocol shift register. This provides the count value BC$\phi$–BC3 on the output of the four-bit counter 140 prior to the transfer of any data from RAM 12 on the serial data link 18. As described above, this is important in an initial Read operation, since data transfer will occur immediately after loading of the protocol word during the first access window. Therefore, the parallel CPU operating in the interleaved mode can examine the count bits C$\phi$–C2 in the first field 51 of the arbitration byte 38 to determine if the serial CPU 28 has access to the system. This allows the parallel CPU 24 to make a determination as to when the system is free for access and thus minimizes the possibility of a collision even on the first access by the serial CPU 28.

The BC3 output of the counter is input to one input of an Exclusive NOR gate 480, the other input thereof connected to the Q-output of a flip flop 482. The output of Exclusive NOR gate 480 is connected to one input of a three-input AND gate 483 another input of which is connected to the signal QARBBY and the third input of which is connected to the output BYTEPUL. The output of the AND gate 483 is connected to one input of a NAND gate 484, the other input of which is connected to the reset input RSTB through invertors 468. The output of NAND gate 484 provides the clock input for flip flop 482 and the clock-bar input through invertor 486. Flip flop 482 has the D-input thereof connected to the Q-bar output and the Q-output provides the Compressed Write Enable signal CWE.

The BYTEPUL signal is generated on the output of a flip flop 488 which is configured similar to the flip flops 454. A transfer gate 490 corresponds to transfer gate 456, a transfer gate 492 corresponds to transfer gate 458 and an invertor 494 corresponds to invertor 462. A three-input NAND gate 496 is provided that corresponds to NAND gate 460. Gate 496 is utilized to prevent the BYTEPUL signal from being generated at the time of the CLK56B signal goes low or on a serial reset. The clock and clock-bar inputs of flip flop 488 are connected to the clock and clock-bar inputs, respectively, of flip flops 454, and the reset input of flip flop 488 is connected to the BYTEPUL output through five series-connected invertors 498 to provide a time delay. The NAND gate 496 has one input thereof connected to the Master Enable signal ME and the other input thereof connected to the output of the invertor 462 on the flip flop 454 associated with the BC3 output. Therefore, when BC$\phi$, BC1, BC2 and RSTB are high, the output of invertor 494 goes high and transfers the Q-bar output to the D-input thereof and the BYTEPUL output goes high at the receipt of the next rising edge of the clock on the flip flop 488 for a predetermined amount of time determined by the invertors 498. This signal which is a pulse indicates the end of a byte which is utilized by the control signal block 138 for output of control signals, and by the address field block 130 to increment the internal counter 348.

The flip flop 488 has the set input thereof connected to the Q-output of a flip flop 500 through a pulse circuit 502. The D-input of flip flop 500 is connected to a positive supply and the clock inputs are connected to the output of a four-input NAND gate 504 which has one input thereof connected to the QARBBY input, one input thereof connected to the BC3 output, one input thereof connected to the reset signal in the output of invertors 468 and the other input thereof connected to the BYTEPUL signal through a delay circuit 506. This creates a second BYTEPUL pulse off of one clock edge in a query arbitration byte access.

Arbitration Byte/Control Circuit

Referring now to FIGS. 15a-15d, there is illustrated detailed logic diagrams of the I/0 buffers/arbitration byte/control logic block 82. The block 82 is comprised of eight I/O buffers and arbitration bits 510 each having three ports, one port interfaced with a data line on bus 14, one port interfaced with a data line on bus 20 and one port interfaced with a data line of bus 34. A control circuit 512 is provided for generating directional control logic signals for select inputs to the I/O buffer and arbitration bits 510. Additionally, the outputs BC$\phi$-BC2 from the four-bit counter 140 are also input to the first three I/O buffers and arbitration bits 510.

The control circuit 512 receives on the input thereof parallel control signals WEPB, CEPB and OEPB and also the serial control signals OESB, WESB and CESB. The arbitration match signals ARBS and ARBP for the serial and parallel ports respectively are also input to the control circuit 512. The ARBS signal is input to one input of an invertor 514, the output of which is connected to the input of a second invertor 516, the output of invertor 516 providing the ARBS output of control circuit 512 for input to the arbitration bits 510. The ARBS signal is also input to one input of a three-input AND gate 518, the output of which provides the WAS signal for input to the arbitration bits 510. The WAS signal is a control signal for indicating a Write Operation to the arbitration bit from the serial port 19. The WESB signal is also input to one input of the AND gate 518 through an invertor 519. The remaining input of the AND gate 518 is connected to the CESB signal through an invertor 520.

The output of invertor 519 is also input to one input of a three-input NAND gate 522, one input of which is connected to the output of invertor 520 and one input of which is connected to the output of invertor 514. The output of NAND gate 522 is connected to one input of a two-input NAND gate 524, the output of which provides the WR output. The WR output provides a control signal for writing to the RAM. The other input of NAND gate 524 is connected to the output of a two-input NAND gate 525, one input of which is connected o the ARBP signal through an invertor 526 and the other input of which is connected to the output of a three-input AND gate 528. The AND gate 528 has one input thereof connected through an invertor 529 to the WEPB signal, one input thereof connected to the CEPB input through an invertor 530 and the other input thereof connected to the output of a two-input NAND gate 532. NAND gate 532 provides the CSBAS output which provides the chip select serial signal or the arbitration serial signal. The NAND gate 532 has one input thereof connected to the output of invertor 514 and the other input thereof connected to the output of invertor 520.

The WESB signal is also input to one input of a three-input NAND gate 534, the output of which provides the RS signal for reading from the serial port. Another input of NAND gate 534 is connected through an invertor 535 to the OESB signal and the remaining input thereof is connected to the output of invertor 520.

The output of invertor 526 is connected through an invertor 536 to provide the ARBP output to the arbitration bits 510. The output of invertor 526 is also connected to one input of a two-input NOR gate 539, the output of which is connected to one input of a two-input OR gate 539, the output of which provides the RP signal for reading from the parallel port. The other input of the OR gate 539 is connected to the output of a two-input NOR gate 540, one input of which is connected to the output of a three-input NAND gate 541 and the other input of which is connected to the output of a two-input NAND gate 542. One input of NAND gate 541 is connected to the WEBP signal, another input thereof is connected through an invertor 544 to the OEPB signal and the remaining input thereof is connected to the output of invertor 530. The NAND gate 542 has one input thereof connected to the output of invertor 526 and the other input thereof connected to the CSBAS signal on the output of NAND gate 532. The ARBP signal is also input to one input of a three-input AND gate 546, the output of which provides the WAP signal to write to the arbitration bits from the parallel port. Another input of the AND gate 546 is connected to the output of the invertor 529 and the remaining input thereof is connected to the output of invertor 530. The output of invertor 530 is also connected through an invertor 548 to provide the CEPB signal for input to the arbitration bits 510.

Figure 15B:
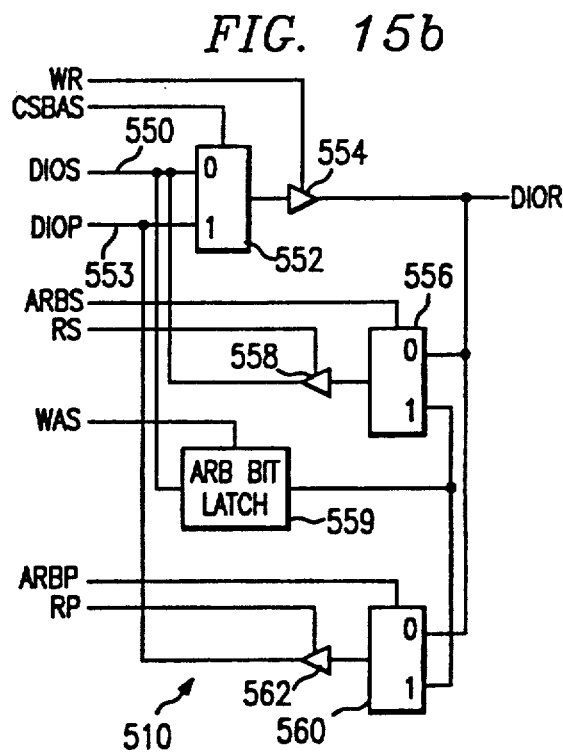
FIGS. 15a–d illustrate logic diagrams of the I/O buffers and arbitration byte.

Referring now to FIG. 15b, there is illustrated a schematic block diagram of the I/O buffer and arbitration bit 510 associated with the data lines DI03, DI04, and DI05 which are also associated with the arbitration bits in fields 53 and arbitration byte 38. As described above, the three bits S$\phi$, S1 and S2 can be read by both the parallel port 49 and the serial port 47, but can only be written to by the serial port 47. The serial input data is received on a data line 550 and labelled DIOS, and is input to a multiplexer 552, the output of which is connected through a transfer gate 554 to the output line DIOR. The other input of the multiplexer 552 is connected to an input line 553, labelled DIOP, which provides the parallel data line. The multiplexer 552 is controlled by the CSBAS control signal and the transfer gate 552 is controlled by the WR signal. Therefore, when the CSBAS signal is low, and the WR signal is high, data from the DIOS line is selected by multiplexer 552 and output to the DIOR line. When CSBAS is high, and WR is high data from DIOP line is selected and output to DIOR line.

The DIOR line is connected to the input of a two-input multiplexer 556, the output of which is connected through a driver 558 to the DIOS line 550. The other input to multiplexer 556 is connected to the output of an arbitration bit latch 559, the input of which is connected to the DIOS line 550. The driver 558 is controlled by the RS control line, the control input to the multiplexer 556 is connected to the ARBS control line and the control input to the arbitration bit latch 559 is controlled by the WAS input. Therefore, when the RS control signal is present and the ARBS input is low, the DIOR line is selected for connection to the DIOS line 550 to provide a Read operation to the serial port. However, when the ARBS signal is high, the contents of the latch 559 are read to the serial port providing the Read operation of the arbitration bit latch 559.

The output of the arbitration bit latch 559 is also input to one input of a multiplexer 560, the output of which is connected through a driver 562 to the DIOP line 553. The other input of the multiplexer 560 is connected to the DIOR line. The control input for the driver 562 is connected to the RP control signal and the control input for the multiplexer 560 is connected to the ARBP control signal. When the RP signal is high indicating a Read operation to the parallel port and the ARBP control signal is low, the data on the DIOR line is read to the DIOP line 553 and to the parallel port. However, when the ARBP signal is high indicating access to the arbitration bit by the parallel port, the contents of the arbitration bit latch 559 are selected by the multiplexer 560 for reading to the DIOP line 553.

Figure 15C:
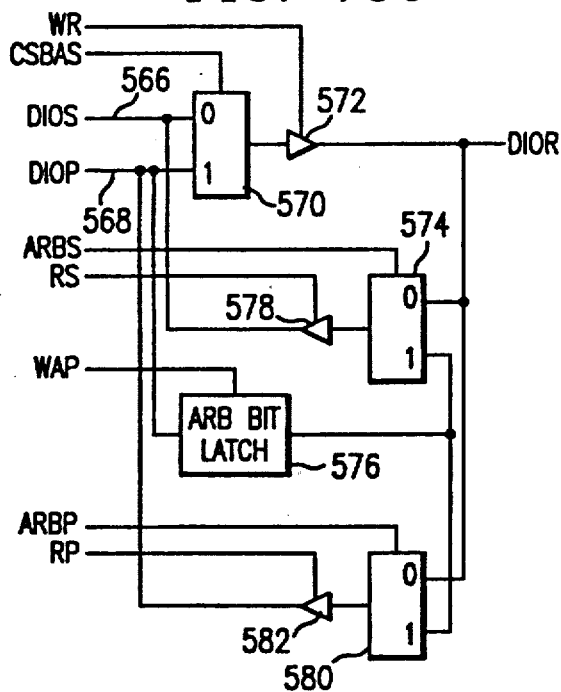

Referring now to FIG. 15c, there is illustrated a schematic block diagram of the I/O buffer and arbitration bit for data lines DIOR6 and DIOR7 which, as described above, correspond to the arbitration bits $B\phi$ and B1 in field 55 in the arbitration byte 38. A data line 566, labelled DIOS, is connected to the serial data bus 34 and a data line 568, labelled DIOP is connected to the parallel data bus 20. Data lines 566 and 568 are input to separate inputs of a two-input multiplexer 570, the output of which is connected through a driver 572 to the DIOR data line. The DIOR data line is interfaced with the system data bus 14. The control input for the multiplexer 570 is connected to the CSBAS signal and the control input for the driver 572 is connected to the WR control signal. When the control signal CSBAS is low and the WR signal is high, data is written from the DIOS line 566 to the DIOR line to provide a Write operation to the RAM from the serial port. However, when the CSBAS signal is high, the data from the DIOP line 568 is written to the RAM through the data line DIOR.

The DIOR line is connected to one input of a multiplexer 574, the other input of which is connected to the output of an arbitration bit latch 576. The input to the latch 576 is connected to the DIOP line 568 for storing data therein from the parallel port. The output of the multiplexer 574 is connected through a driver 578 to DIOS line 566. The driver 578 has the control input thereof connected to the RS control signal, the multiplexer 574 has the control input thereof connected to the ARBS control signal and the latch 576 has the control input thereof connected to the WAP control signal. Therefore, the latch 576 is operable to have the contents thereof replaced by information from the DIOP line 568 in the presence of the WAP signal. The driver 578 is activated in the presence of the RS control signal indicating a Read to the serial port. Therefore, when the ARBS signal is low, the data on the DIOR line is read to the serial port, and when the ARBS signal is high, the contents of the latch 576 are read to the serial port.

The DIOR line is also connected to one input of a multiplexer 580 and the other input thereof is connected to the output of the latch 576. The output of multiplexer 580 is connected through a driver 582 to the DIOP line 568. The driver 582 has the control input thereof connected to the RP signal and the multiplexer 580 has the control input thereof connected to the ARBP control signal. Therefore, when the RP signal is present and the ARBP signal is low, the data on the DIOR line is read to the DIOP line 568 and the parallel port. When the ARBP signal is high, the contents of the latch 576 are read to the parallel port.

Figure 15D:
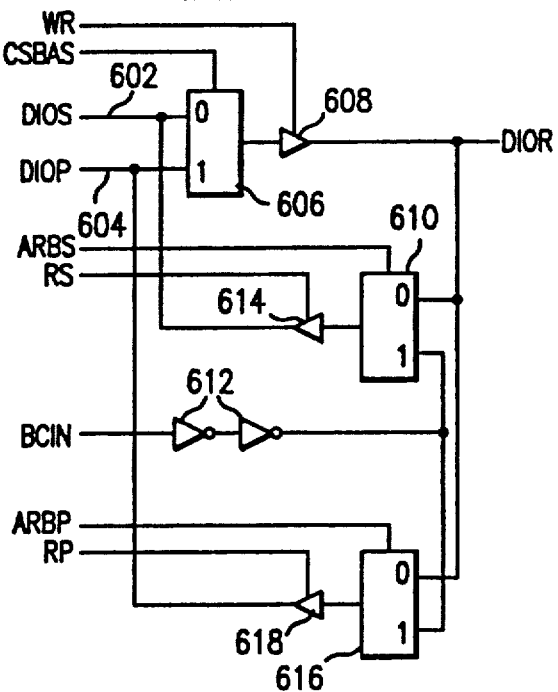

Referring now to FIG. 15d, there is illustrated a schematic block diagram of the I/O buffer and arbitration bit 510 for data lines $DIOR\phi$, DIOR1, and DIOR2 which, as described above, are associated with arbitration bits $C\phi$, C1 and C2 in field 51 of the arbitration byte 38. A data line 602, labelled DIOS, comprises one of the data lines in bus 34 for interfacing with the serial port and a data line 604, labelled DIOP, is provided for interfacing with bus 20 for the parallel port. Data line 602 is one input of a multiplexer 606, the other input of which is connected to the data line 604. The output of multiplexer 606 is connected to the DIOR data line through a transfer gate 608. The control input for the transfer gate 608 is connected to the WR control signal and the control input for the multiplexer 606 is connected to the CSBAS control signal. When WR is high indicating a Write operation to the RAM from either the serial or the parallel port, the control signal CSBAS selects data line 602 or the data line 604 for connection to the data line DIOR. When CSBAS is low, data line 602 is selected and when CSBAS is high, data line 604 is selected.

The data line DIOR is connected to one input of a two-input multiplexer 610, the other input of which is connected through two series connected invertors 612 to the BCIN input. The output of a multiplexer 610 is connected through a transfer gate 614 to the DIOS data line 602. The control input for the transfer gate 614 is connected to the signal RS and the control input for the multiplexer 610 is connected to the signal ARBS. When RS is high, indicating a Read to the serial port, the multiplexer 610 selects the data on the line DIOR if ARBS is low, or the BCIN value if ARBS is high for output to the serial port through the DIOS data line 602.

The DIOR line is also connected to one input of a multiplexer 616, the other input of which is connected to the BCIN input through the invertors 612. The output of multiplexer 616 is connected through a transfer gate 618 to the DIOP line 604. The control input of the transfer gate 618 is connected to the RP input indicating a Read to the parallel port, and the control input to the multiplexer 616 is connected to the ARBP input. When ARBP is low, the data line DIOR is selected, and when ARBP is high, the BCIN input is selected. Multiplexer 616 and transfer gate 618 therefore allow the parallel port to read the count input in the arbitration byte 38 or read data from the RAM 12.

Control Mux

Referring now to FIG. 16, there is illustrated a logic diagram of the control multiplexer 94 of FIG. 4. The multiplexer 94 is comprised of a multiplexer 624 operable to have three pairs of inputs for being connected to an associated one of three outputs on lines 96. The multiplexer is controlled by the logical "OR" of the CESB input and the ARBS input such that whenever a Chip Enable for the serial port is present and the serial port is not accessing the arbitration byte 38, the control signals for the serial port are selected and, when the Chip Enable signal for the serial port is not present, the control signals for the parallel port are selected. Two inputs on the Aφ and A1 inputs comprise the CESB and CEPB inputs, which are selected for connection to the CERB output. The CESB input is connected to one input of an OR gate 634, the other input of which is connected to the ARBS signal and the output connected to the Aφ input. The OESB signal is input to multiplexer 624 on the Cφ input and the OEPB signal is input to one input of a NAND gate 635 through an invertor 637, the output of NAND gate 635 connected to the C1 input. The other input of NAND gate 635 is connected to the output of invertor 636. The Write Enable signal WEPB is input to a NAND gate 628 through invertor 632. The other input of NAND gate 628 is connected to the ARBP input through an invertor 636. The output of the NAND gate 628 is input to the multiplexer 624 on input B1. The WESB input is connected to the Bφ input. Therefore, the only time the RAM control signals CERB, WERB, OERB will be driven by the serial port is when CESB is a "0" and ARBS is a "0". If CESB is a "1" and ARBP is a "0" the RAM control signals CERB, WERB, OERB will be driven by the parallel port.

Parallel Port Control Buffers

Referring now to FIG. 17, there is illustrated a logic diagram of the parallel port control buffers 90 of FIG. 4. The input Write Enable signal INWEPB is input to one input of an OR gate 638, the other input of which is connected to the CEPB output. The output of OR gate 638 provides the WEPB output. The Output Enable signal that is input to the control buffer 90 is input to one input of an OR gate 640, the other input of which is connected to the CEPB output signal and the output of which comprises the OEPB signal. The input Chip Enable signal INCEPB is input to one input of an OR gate 642, the other input of which is connected to ground and the output of which comprises the CEPB signal. Therefore, when the Chip Enable signal is absent, generation of the Write Enable and Output Enable signals is inhibited.

In summary, there has been provided an arbitration circuit for interfacing between a serial port and a parallel port and a parallel system port. The arbitration system allows for an interleaved operation of the parallel port with the serial port such that the parallel port is allowed to access the system port during collection of data by the serial port. The parallel port operates asynchronously and is inhibited from accessing the parallel system port during access of the system port by the serial port wherein data is either transmitted to the system port or received therefrom during an access window. This access window occurs after collection of serial data and conversion thereof to parallel data for a Write operation or after transmission of a serial byte of data before conversion of parallel to serial data during a Read operation. A counter is provided which is synchronized to a serial port clock that generates a count value that is stored in a memory location. The memory location is accessible by the parallel port to determine the duration of time between the access window for the serial port.

Although the preferred embodiment has been described in detail, it should be understood that various changes, substitutions and alterations can be made therein without departing from the spirit and scope of the invention as defined by the appended claims.

What is claimed is:

1. An arbiter for selectively interfacing a serial input port and a parallel input port with a parallel system port for transfer of information therebetween, comprising:
    a serial communication link connected to the serial port for transmitting and receiving serial information;
    a parallel communication link connected to the parallel input port for transmitting and receiving parallel information;
    converting means for receiving parallel information from the parallel system port and converting it to serial information for transmission to the serial communication link and for receiving serial information from the serial communication link and converting it to parallel information for transmission to the parallel system port;
    serial port access means for transferring parallel data between the parallel system port and said converter means during a predetermined access window;
    storage means for determining and storing the duration of time before the occurrence of said access window;
    means for accessing the predetermined duration of time stored in said storage means for output to the parallel port in response to signals received from the parallel port;
    parallel port access means for inhibiting access by the parallel port during said access window; and
    means for transferring parallel information between the parallel input port and the parallel system port outside of said access window.

2. The arbiter of claim 1 wherein said conversion means comprises:
    shift register means for operating in a serial to parallel mode and in a parallel to serial mode, said shift register means in the serial to parallel mode for periodically receiving information from said serial communication link and collecting the received serial information for transmission therefrom as parallel information during said access window, said shift register means in the parallel to serial mode for receiving parallel information during said access window and converting said received parallel information to serial information for transmission to said serial communication link;
    control means operative in response to signals received from the serial port to operate said shift register means in either the serial to parallel mode or the parallel to serial mode.

3. The arbiter of claim 1 wherein said serial communication link includes a synchronizing signal and further comprising means for generating said access window in response to receiving said synchronizing signal.

4. The arbiter of claim 1 wherein said access window occurs periodically and is synchronized with the serial information transmitted on said serial communication link, the parallel information that is transmitted to and received from said parallel port not synchronized with said access window.

5. The arbiter of claim 1 wherein said storage means comprises:
   counter means synchronized with said access window for generating a count value indicative of the duration of time before the occurrence of the next to occur access window; and a storage register for storing said count value, said storage register accessible by said storage access means.

6. The arbiter of claim 2 and further comprising control storage means for receiving control commands from said serial port upon initiation of access to the arbiter by the serial port, said control means operating in response to information contained in said control storage means.

7. The arbiter of claim 6 wherein a synchronizing signal is received from said serial communication link and said access window is synchronized with said synchronizing signal and further comprising means for generating said access window in response to receiving said synchronizing signal.

8. The arbiter of claim 7 wherein said storage means is operable to determine the duration of time before the occurrence of the first to occur of said access windows, said access windows occurring periodically and in synchronization with said synchronization signal.

9. An arbiter for selecting between a parallel port and a serial port and interfacing address and data information between the selected parallel or serial port and a parallel system port, comprising:
   serial to parallel conversion means for receiving data and address information from the serial port and converting the serial address and data information into parallel address and data information;
   parallel to serial conversion means for receiving parallel data and converting the received parallel data to serial data for transmission to the serial port;
   transfer means operable in a serial transfer mode to transfer data and address information from said serial to parallel conversion means to the system port and to transmit data from the system port to the said parallel to serial conversion means, said transfer means operable in a parallel transfer mode to transfer parallel data and information from the parallel port to the system port and data from the system port to the parallel port;
   control means for generating a serial port access window and controlling said transfer means to operate in the transfer mode only during said serial port access window, said control means controlling said transfer means to operate in the parallel transfer mode when said serial port access window is not generated, said control means generating said serial port access window in response to control signals received from the serial port;
   timing means for determining the duration of time before generation of said access window by said control means;
   storage means for storing as a digital word the duration of time determined by said timing means; and
   access means for outputting the contents of said storage means to the parallel port as data in response to receiving storage request signals from the parallel port.

10. The arbiter of claim 9 wherein said serial to parallel conversion means and said parallel to serial conversion means comprise:
    data shift register means having a serial data input/output connected to the serial port and a parallel data input/output connected to said transfer means, said data shift register means operating in a serial to parallel mode to receive serial data on the serial data input/output and converting it to parallel data for output on the parallel data input/output, and in a parallel to serial mode to receive parallel data from said parallel data input/output and convert it to serial data for output on said serial data input/output, said data shift register means controlled by said control means to operate in the serial to parallel mode for a serial Write operation and in the parallel to serial mode for a serial Read operation in response to control signals received by said control means from the serial port;
    a serial to parallel converter for receiving said serial address information and converting it to parallel address information for output to said transfer means.

11. The arbiter of claim 9 wherein said transfer means comprises:
    a data multiplexer having one input for being interfaced with the data portion of the system port, one port for being interfaced with the data portion of the parallel port and one port for being interfaced with the data portion of said serial to parallel conversion means, said data multiplexer controlled by said control means to connect the port associated with said serial to parallel conversion means to the port associated with the system port during said access window when said access window is generated and connect said second port with said first port at all other times; and
    an address multiplexer having the first input connected to the address portion of the system port, and the second input connected to the address portion of the parallel port and a third input connected to the address portion of the output of said serial to parallel conversion means, said address multiplexer controlled by said control means to select the third input for connection to said first input during said access window and for selecting the second input for connection to said first input at all other times.

12. The arbiter of claim 9 wherein a serial clock is received by the arbiter at the serial port and said control means further synchronizes generation of said access window to the serial clock with said access window being periodically generated.

13. The arbiter of claim 9 wherein the system port has a data access time associated therewith and the duration of said window equals or exceeds the data access time of the system port.

14. The arbiter of claim 12 wherein said timing means comprises counter means for providing a count value which varies between a minimum to a maximum value indicating the end of an access window at the minimum value and the initiation of an access window at the maximum value wherein the count value at any given time indicates the duration of time before the generation of the next to occur of said access windows.

15. The arbiter of claim 14 wherein said storage means comprises a parallel register for receiving the output of said counter and for interfacing with said access means.

16. The arbiter of claim 9 and further comprising:
means for receiving control information from the serial port upon initiation of access to the arbiter by the serial port;
means for storing said received control information for access by said control means;
said first access window generated after receiving said control information by said means for receiving and storing thereof by said means for storing; and
said storage means operable to store a predetermined value therein representative of the maximum value for the duration of time before occurrence of said access window.

17. The arbiter of claim 16 wherein said timing means further comprises means for determining the duration of time before generation of the first to occur of said access windows prior to full receipt of said control information but after initiation of the receipt of said control information by said means for receiving.

18. The arbiter of claim 9 wherein the system port is interfaced with a random access memory, said random access memory having a plurality of storage locations therein, each of said storage locations associated with a unique address, said random access memory operable to receive a predetermined address from the system port to either Read data from the storage locations thereof or Write data to the storage locations thereof.

19. The arbiter of claim 9 wherein said storage means has a predetermined address associated therewith and said access means is operable to recognize said predetermined address and output the contents of said storage means in response to receiving said address on the address portion of the parallel port.

20. The arbiter of claim 9 and further comprising access means for outputting the contents of said storage means to the serial port as serial data in response to receiving access signals from the serial port.

21. An arbiter for selecting between a parallel port and a serial port each having data and information contained thereon and interfacing address and data information between the selected one of the parallel or serial ports and a parallel system port, comprising:
shift register means having a serial input/output port and a parallel input/output port and operable in a serial/parallel mode and a parallel/serial mode, said shift register means in the serial/parallel mode for receiving data from the serial port and converting it to parallel data for a serial Write operation and in the parallel/serial mode for receiving data on the parallel input/output port for output on the serial output/input port for a serial Read operation;
address register means for receiving serial address information from the serial port and converting it to parallel address information for output therefrom;
a data multiplexer for selectively interfacing the output of said parallel input/output port of said register means to the data portion of the system port in response to a serial access signal and for interfacing the parallel portion of the parallel port to the data portion of the system port in the absence of said serial access signal;
an address multiplexer for interfacing the output of said address register means to the address portion of the system port in response to the presence of said serial access signal, and interfacing the address portion of the parallel port to the address portion of a system port in the absence of said serial access signal;
control means for receiving control information and synchronizing information from the serial port upon access thereby and generating said serial access signal during a serial access window, said serial access window periodically occurring after receipt of the control information;
timing means for determining the duration of time before the occurrence of said access window and outputting a digital value corresponding thereto;
a storage register for storing said digital value; and
access means for accessing said digital value stored in said storage register for output to the data portion of the parallel port in response to parallel port access signals received from the parallel port.

22. The arbiter of claim 21 wherein said address register means is operable to receive an initial address from the serial port for internal storage therein and increment said stored address at the end of each of the periodically generated access windows.

23. The arbiter of claim 21 wherein a serial clock signal is received from the serial port by said control means for synchronizing therewith, said serial clock synchronized with the control information and the data and address information on the serial port.

24. The arbiter of claim 21 wherein data information is transmitted on the serial port in bytewide data words and said access window is generated at the end of each byte of information.

25. The arbiter of claim 21 wherein said timing means comprises a counter that is initiated at the end of each of said periodically occurring access windows and varying from a minimum count at the end of each of said access windows to a maximum count at the beginning of each of said access windows, said counter outputting a digital count value for storage in said storage register as said digital value.

26. The arbiter of claim 21 wherein said storage register has a unique address associated therewith and said means for accessing said storage register comprises:
means for receiving the address information from the parallel port and comparing it with a predetermined reference to determine if the address transmitted to the arbiter at the parallel port is said unique address; and
means for transferring the contents of said storage register to the data portion of the parallel port if a match exists.

27. The arbiter of claim 21 and further comprising means for accessing said digital value for output to the parallel input/output port of said shift register means for conversion to serial data and output to the serial port in response to serial port control signals received from the serial port.

28. The arbiter of claim 21 and further comprising means for storing a predetermined digital value in said storage register when the serial port does not access the arbiter.

29. The arbiter of claim 21 and further comprising means for generating said digital value prior to the occurrence of said access window in response to access of the arbiter by the parallel port but prior to generation of the first to occur of said access windows.

30. The arbiter of claim 21 and further comprising central processor means associated with the parallel port, said central processor means including:
means for periodically generating said access signal for transmission to said access means;
means for receiving said digital values from said means for accessing;
means for determining the expected occurrence of said access window; and
means for generating the address and data information for the parallel port prior to and after the expected occurrence of the access window.

31. A method for selecting between a parallel port and a serial port and interfacing address and data information between the selected parallel or serial port and a parallel system port, comprising:
generating a serial port access window during which the serial port is allowed to access the system port;
receiving serial address information from the serial port and converting it to a parallel address for transfer to the system port during the serial port access window for a serial Read or Write operation;
receiving serial data information from the serial port during a serial Read operation and converting it to parallel data for transfer to the system port during the serial access window;
receiving parallel data from the system port during the serial port access window during a serial Read operation and converting it to serial data for transmission to the serial port;
receiving parallel address and data information from the parallel port at all times outside of the serial port access window and transferring the parallel address and data information from the parallel port to the system port when received;
determining the duration of time before generation of the access window;
storing the duration of time determined as a digital word; and
output of the contents of/the storage register to the parallel port as data in response to receiving access request signals from the parallel port.

32. The method of claim 31 and further comprising receiving a serial clock signal at the serial port and synchronizing generation of the access window to the serial clock, the access window being periodically generated.

33. The method of claim 31 wherein the system port has a data access time associated therewith and the duration of the access window equals or exceeds the data access time of the system port.

34. The method of claim 32 and further comprising providing a counter synchronized with the clock for providing a count value that varies between a minimum and a maximum value, the count value indicating the end of an access window at the minimum value, and the count value indicating the next to occur access window at the maximum value, wherein the count value at any given time indicates the duration of time before the generation of the next to occur of the access windows.

35. The method of claim 31 and further comprising:
generating the access request signals and transmitting them to the parallel port;
receiving the predetermined duration of time from the storage register; and
generating the parallel data and address information and transmitting it to the parallel port for transfer to the system port during a period of time outside of the access window such that no data or address information at the parallel port is transmitted to the system port during the access window.

36. The method of claim 35 and further comprising determining the expected occurrence of the access window and providing a predetermined safety period, before which parallel data and address information cannot be transmitted to the parallel port.

37. The method of claim 31 and further comprising:
receiving control information from the serial port upon initiation of access to the arbiter by the serial port;
storing the control information;
the first access window generated after receiving and storing the control information; and
storing the predetermined value therein representative of the maximum value for the duration of time before occurrence of the access window.

38. The method of claim 37 and further comprising determining the duration of time before generation of the first to occur access window when the determined duration of time is less than the maximum value stored in the storage register and prior to full receipt of the control information but after initiation of the receipt of the control information at the serial port.

39. The method of claim 31 and further comprising interfacing the system port with a random access memory, the random access memory having a plurality of storage locations therein, each of the storage locations associated with a unique address, the random access memory operable to receive a predetermined address from the system port to either read data from the address location or write data to the address location.

40. The method of claim 31 wherein the storage register has a predetermined address associated therewith and the step of accessing the stored duration of time operable to recognize the predetermined address when transmitted on the parallel port and output the contents stored in the register to the parallel port in response to receiving the address on the address portion of the parallel port.

41. The method of claim 31 and further comprising outputting the contents of the storage register to the serial port as serial data in response to receiving access signals from the serial port.

* * * * *